US005555410A

United States Patent [19]

Tsuchiya

[11] Patent Number: 5,555,410
[45] Date of Patent: Sep. 10, 1996

[54] GENERATION MANAGEMENT SYSTEM AND METHOD FOR MANAGING RESOURCE GENERATION USING PRE-EDIT AND POST-EDIT LINE RENUMBERING

[75] Inventor: Shoji Tsuchiya, Kanagawa, Japan

[73] Assignee: Fujitsu Limited, Kanagawa, Japan

[21] Appl. No.: 304,406

[22] Filed: Sep. 12, 1994

[30]   Foreign Application Priority Data

Oct. 5, 1993  [JP]  Japan .................................. 5-248975

[51] Int. Cl.⁶ ........................................... G06F 17/30
[52] U.S. Cl. .................. 395/600; 395/146; 395/700; 364/DIG. 1; 364/282.1; 364/222.82
[58] Field of Search .................................. 395/600, 700, 395/146

[56]   References Cited

U.S. PATENT DOCUMENTS

| 4,513,391 | 4/1985 | Maddock | 395/146 |
|---|---|---|---|
| 4,809,170 | 2/1989 | Leblang et al. | 395/700 |
| 5,040,142 | 8/1991 | Mori et al. | 395/146 |
| 5,278,979 | 1/1994 | Foster et al. | 395/600 |
| 5,339,431 | 8/1994 | Rupp et al. | 395/700 |
| 5,355,476 | 8/1994 | Fukumura | 395/600 |
| 5,481,722 | 1/1996 | Skinner | 395/700 |

OTHER PUBLICATIONS

Tichy, "RCS–A System for Version Control", Software–Practive and Experience, vol. 15(7), 637–54.

*Primary Examiner*—Wayne Amsbury

[57]   ABSTRACT

A generation management system includes a renumbering device for renumbering pre-edit software in conformity with post-edit and renumbered software for those lines existing commonly in the pre-edit software and post-edit software. By comparing the renumbered pre-edit software and renumbered post-edit software, history information indicative of deletion and insertion of lines is obtained.

16 Claims, 20 Drawing Sheets

PRIOR ART
FIG. 2A

```
LN #    CONTENT
000100  main()
000200  {
000300  int a,b;
000400  a++;
000500  b--;
000600  }
```
230

PRIOR ART
FIG. 2B

```
LN #    CONTENT
000100  main()
000200  {           ,-MOD
000300  int a,b,c;
000310  a=b=c=0;
000400  a++;        `-INS
000500  b--;
000510  c+=10;
000600  }           `-INS
```
231

PRIOR ART
FIG. 2C

| LEVEL | LN # | CONTENT | PROC |
|---|---|---|---|
| 2 | 000300 | int a,b; | D |
| 2 | 000300 | int a,b,c; | I |
| 2 | 000310 | a=b=c=0; | I |
| 2 | 000510 | c+=10; | I |

(D:DEL; I:INS)

232

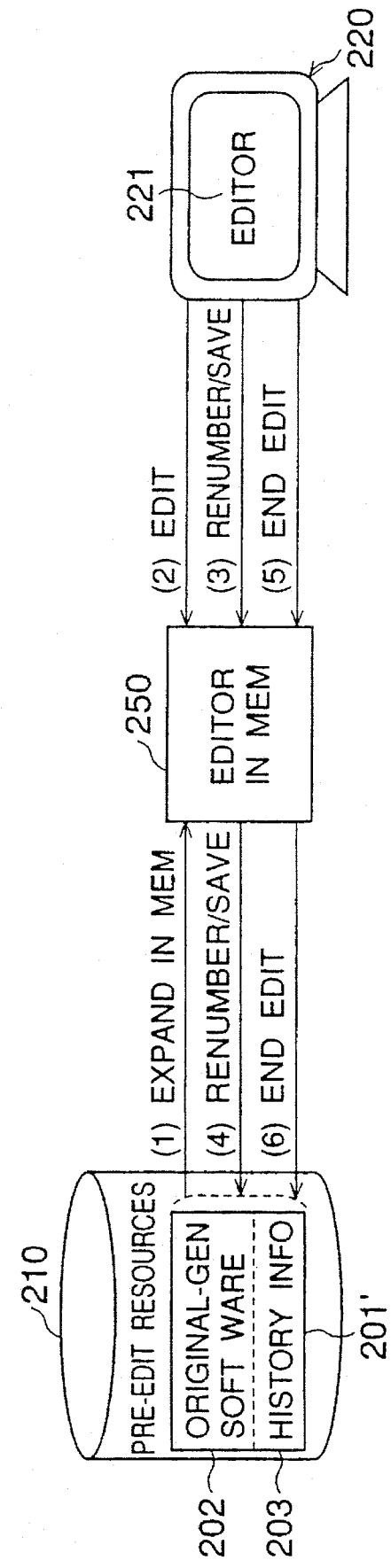

PRIOR ART
FIG. 5A

280 — 
```
LN#     CONTENT

001100****if(a*<*b)
001200******c*=*1
001300****else
001400****c*=*2
```
PRE-EDIT SOFTWARE
(LEVEL 1)

PRIOR ART
FIG. 5B

```
LN#     CONTENT

001100****if(a*<*b)
001200******c*=*1
001300****else
001400****[**]c*=*2
```
— 281

— INS SPACE

POST-EDIT SOFTWARE
(LEVEL 2)

PRIOR ART
FIG. 5C

```
LEVEL  LN#       CONTENT        PROC 2    001400****c*=*2            D
  2    001400******c*=*2          I
```
— 282

HISTORY INFO

(10) DECIDE — DOES CONTENT OF OLD RESOURE AND NEW RESOURE AGREE?

(11) NO (NOT AGREE, CHANGE HAS BEEN MADE AFTER IMPORT)

(12) SET IN HISTORY INFO : "DEL : LN OF OLD RESOURES"
"INS : LN OF NEW RESOURES"

(13) ONLY OLD LN# EXIST (DEL HAS BEEN MADE AFTER IMPORT)

(14) SET IN HISTORY INFO : "DEL : LN OF OLD RESOURES"

(15) ONLY NEW LN# EXIST (INS HAS BEEN MADE AFTER IMPORT)

(16) SET IN HISTORY INFO : "INS : LN OF NEW RESOURES"

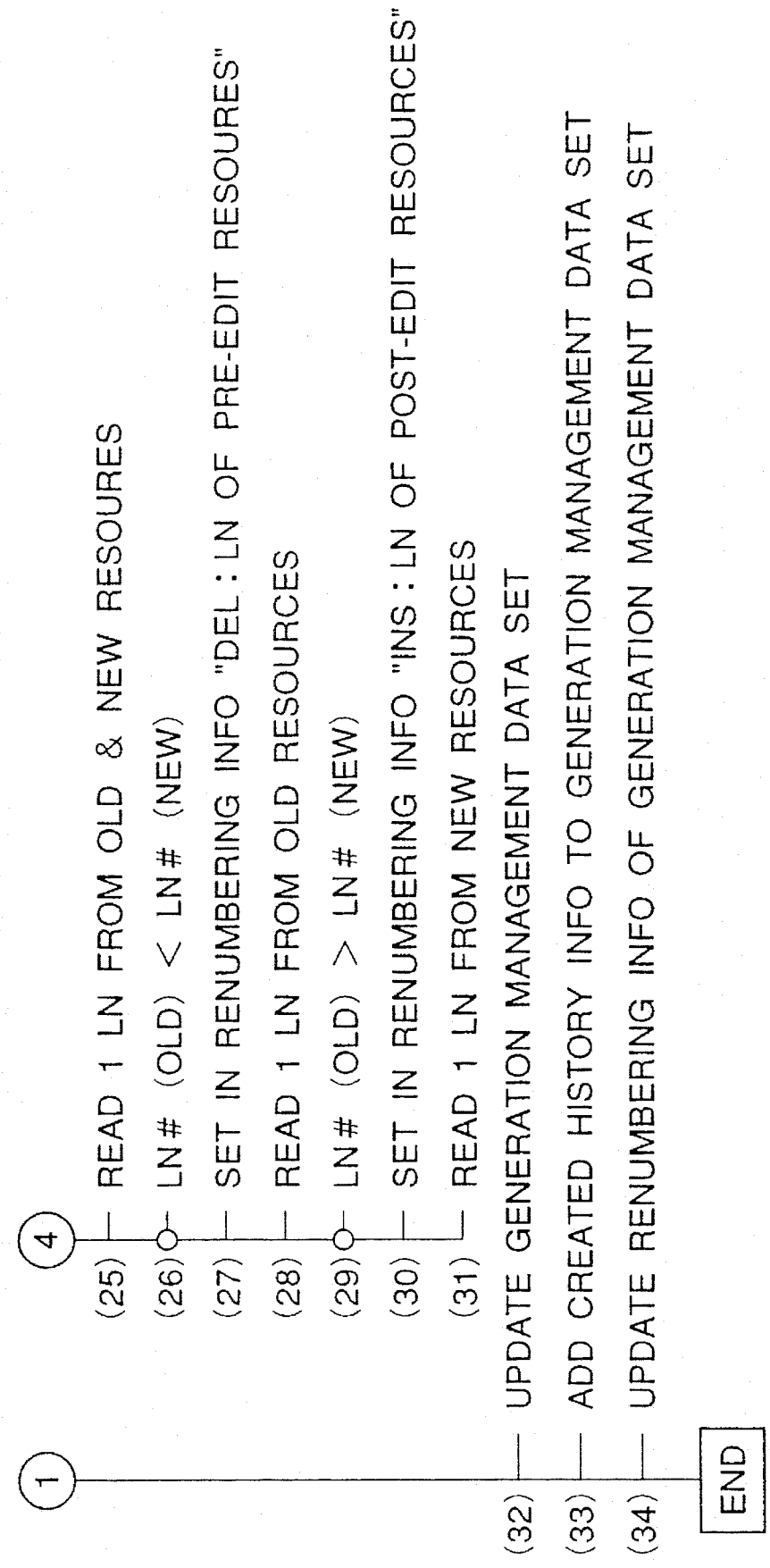

FIG.19A

| ORIG LN# | CURRENT LN# |
|---|---|
| 000100 | 000100 |
| 000200 | 000200 |
| 000300 | 000300 |
| 000400 | 000400 |
| .. | .. |
| 010000 | 010000 |

FIG.19B

| BEFORE RENUMBER | AFTER RENUMBER |
|---|---|
| 000100 | 000100 |
| 000200 | 000200 |
| 000300 | 000300 |
| 000400 | 000400 |
| .. | .. |
| 010000 | 010100 |

FIG.19C

| ORIG LN# | CURRENT LN# |
|---|---|
| 000100 | 000100 |
| 000200 | 000200 |
| 000300 | 000300 |
| 000400 | 000400 |
| .. | .. |
| 010000 | 010100 |

FIG.19D

| ORIG LN# | CURRENT LN# |
|---|---|
| 000100 | 000100 |
| 000200 | 000200 |
| 000300 | 000300 |
| 000400 | 000400 |
| .. | .. |
| 010000 | 010100 |

FIG.19E

| BEFORE RENUMBER | AFTER RENUMBER |
|---|---|
| 000100 | 000100 |
| 000200 | 000200 |
| 000300 | 000300 |
| 000400 | 000400 |
| .. | .. |
| 010100 | 010100 |

FIG.19F

| ORIG LN# | CURRENT LN# |
|---|---|
| 000100 | 000100 |
| 000200 | 000200 |
| 000300 | 000300 |
| 000400 | 000400 |
| .. | .. |
| 010100 | 010100 |

GENERATION MANAGEMENT SYSTEM AND METHOD FOR MANAGING RESOURCE GENERATION USING PRE-EDIT AND POST-EDIT LINE RENUMBERING

BACKGROUND OF THE INVENTION

The present invention relates to generation management systems and methods for managing the generation of resources such as computer program, forms, and various format definitions.

Software is continuously subjected to revision for improved versions, and numerous new version software are created as a result. In the software development, there is a need for saving software under development, in addition to the software currently used. Thus, there is a need of version management for at least two versions of software, one for the software under development and the other for the software currently in use.

Conventionally, the development of software has been achieved by means of a host computer that manages entire software integrally. Thus, an operator accesses to the host computer by way of the TSS (time sharing system) function when conducting software development. In such a case, management of software generation is achieved relatively easily.

On the other hand, in the distributed environment of software development in which software resources managed integrally in the host computer, are exported or copied to respective workstations or terminals for edition, there is a tendency that discrepancy increases between the software versions created by the terminals as a result of the software development and the software version held in the host computer. Thus, there occurs an increase in the amount of information needed for version management, and there arises a difficulty in conducting the effective version management.

Under such a situation, there exists a demand for an integrated generation management system or method that is suitable for managing various software. Particularly, there is a demand for a generation management system or method suitable for software development under distributed environment.

FIG. 1 shows a conventional system for software management.

Referring to FIG. 1, the system includes a host computer 200 and a resource-generation manager 201 for managing the generation of the software that is managed by the host computer 200. In the resource-generation manager 201, there is provided a generation management data set 201 formed of original-generation software 202 serving for the basis of generation management, as well as history information 203 used for the generation management. Generally, the newest version software or the oldest version software is employed for the original-generation software 202. Further, the history information 203 indicates the location of the software in which the modification has been made to the original-generation software 202. Further, the system includes a storage device 210 for storing the software managed by the host computer.

Further, the system of FIG. 1 includes a workstation 220 connected to the host computer 200 via a network 225, wherein the workstation 220 is used for running as well as for developing software resources held in the host computer 200. It should be noted that the work station 220 includes an editor program 221 for importing or copying the software from the host computer 299 and for editing the software thus copied.

Next, a conventional generation management will be described with reference to FIGS. 2A–2C, wherein FIGS. 2A–2C show the case in which the modified software is not renumbered with respect to the lines.

Referring to the drawings, FIG. 2A shows a Level-1 state 230 corresponding to the state of the software before any edition is made. In other words, the numeral 230 indicates the pre-edit software as copied from the host computer 200. FIG. 2B, on the other hand, shows a Level-2 state 231 of the software after an edition is applied. In other words, the reference numeral 231 indicates the post-edit software. In the example of FIG. 2B, the description at line #300 is changed and lines #310 and #510 are inserted as a result of the edition.

Further, FIG. 2C shows history information 232, wherein the history information 232 indicates the history of the edited software 231. In the history information 232, it should be noted that the deletion of a line is designated by D while the insertion of a line is designated by I.

In operation, the workstation 220 of FIG. 1 copies the generation management data set 201' from the host computer 200, and the workstation 220 holds therein the pre-edit software 230 as a result. The pre-edit software 230 is subjected to an edition by the editor 221. For example, the description at the line #300 is changed as indicated and a description is inserted at the lines #310 and #510. As a result, the post-edit software 231 is created.

The workstation 220 then transfers the post-edit software 231 thus created to the host computer 200, wherein the resource-generation manager 201 of the host computer 200 compares the post-edit software 231 and the pre-edit software 230 and creates the history information 232. The history information 232 thus created updates the old history information. Thus, record is made in the history information 232 about the deletion of the line #300 as well as about the insertion of the new, modified description at the line #300. In addition, record is made about the insertion of description at the lines #310 and #510.

FIG. 3 shows another operational mode of the system of FIG. 1 for using the pre-edit software in which the lines are renumbered.

Referring to FIG. 3, the system forms a part of the system of FIG. 1 and includes the storage device 210 cooperating with the host computer 200 for storing pre-edit software as the software resources. Similarly as before, the storage device 210 stores therein the generation management data set 201', the original-generation software 201, and the history information 203. Further, the workstation 220 includes the editor 221.

It should be noted that the workstation 220, connected to the storage device 210 of the host computer 200 via the network 225 not shown in FIG. 3, is equipped with a memory 250, wherein the memory 250 provides a user space for storing the software resources in the process of editing.

Hereinafter, conventional process of renumbering will be described step by step.

STEP (1)

The generation management data set 201' held in the storage device 210 is copied to the workstation. The data set 201' thus copied is subsequently expanded in a user space of the workstation provided by the memory 250.

STEP (2)

Edition is made in the user space of the workstation by using the editor 221.

STEP (3)

Instruction is provided for renumbering the software thus edited.

STEP (4)

Instruction is made from the workstation to the host computer for saving the renumbered software.

STEP (5)

Instruction is made from an operator via the editor 221 to end the process of edition.

STEP (6)

Transfer of the post-edit software is made to the host computer after renumbering, to effect the termination of the process of edition. Thereafter, the history information is created in the host computer 200 based upon the software of the newly created version (post-edit software 231) and the original-generation software (pre-edit software 230). Further, the generation management data set 201' is updated based upon the result of comparison.

FIG. 4 shows another conventional software resource management wherein the renumbering is made after insertion of a line.

Referring to FIG. 4, there is provided a generation management data set 260 held in a storage device of a host computer, wherein the data set 260 includes original-generation software 261 and generation information 262. Further, there exits pre-edit software 265 cooperating with a workstation, wherein the pre-edit software 265 is the software of the Level-1 state copied to the workstation.

FIG. 4 further shows a user space 266 provided in the memory of the work station. It should be noted that the user space 266 shows the pre-edit software in the state of editing. Further, there is shown post-edit software 267 that corresponds to the software created by renumbering the pre-edit software 265. Further, there is shown history information 268 that is created by the host computer based upon the post-edit software 267.

In operation, the host computer creates the pre-edit software 265 based upon the generation management data set 260 for the pre-edit software, and the pre-edit software 265 is copied to the workstation.

In the workstation, edition is made to the pre-edit software 265 of the Level-1 state as indicated in FIG. 4, wherein FIG. 4 shows an example of inserting a description at the line #310 during the process of the edition conducted in the user space 266.

After the edition in the user space 266, the software thus edited is subjected to a renumbering process, and post-edit software 267 is created as a result, such that the post-edit software 267 have new line numbers. In the illustrated example, the line #310 before renumbering is now changed to the line #400. Associated with the foregoing change, the line numbers following the line #400 are all changed as indicated in FIG. 4. The post-edit software 267 thus created is then transferred to the host computer and history information 268 is created. Further, the history information 268 thus created updates the old history information. Similarly as before, the deletion of a line is designated by "D" and the insertion of a line is designated by "I." Thus, the old line #400 is deleted and a new description is inserted as the line #400 in the history information 268. Similarly, the old line #500 is deleted and a new description is inserted as the line #500. In other words, all of the lines #400–#600 are recorded in the history information 268 as the line experienced a change, while the change of the lines #400–#600 is merely a change of the line number and not material to the content.

FIGS. 5A–5C show still other conventional resource management including the process of inserting a blank to the description of a line.

Referring to FIG. 5A showing pre-edit software 280 corresponding to the Level-1 state, it will be noted that the lines include a blank space represented by a symbol "*." As a result of edition in the workstation, two additional blank spaces are added to the description of the line #1400 in the illustrated example of FIG. 5B that shows post-edit software 281. Further, it will be noted that history information 282 is created in the host computer based upon the comparison between the pre-edit software 280 and the post-edit software 281 as indicated in FIG. 5C.

As will be noted from FIG. 5C, the history information 282 includes a record for deletion of a line before insertion of the blank spaces as well as a record for insertion of a line in which blank spaces are added. For example, the history information 282 includes a record "D" for the old line #1400 and a record "I" for the new line #1400 in which two additional blanks are added.

Summarizing the above, conventional generation management of software resources includes the processes of comparing the pre-edit software and post-edit software in terms of the lines and creating historical information based upon the discrepancy detected as a result of the comparison. Thus, such a conventional generation management has a drawback in that the amount of history information increases enormously when a line is inserted by way of edition followed by renumbering of the lines. It should be noted that such a renumbering process causes an extensive discrepancy between the pre-edit software and the post-edit software in terms of the lines, while such a discrepancy is not material in most of the cases.

Further, such conventional generation management process has a drawback in that meaningless history information is created in such a case that blank spaces are added to the description of a line. In such a case, it should be noted that the meaning of description of the line is not changed at all, while the history information recognizes that there occurred a substantial change of description.

SUMMARY OF THE INVENTION

Accordingly, it is a general object of the present invention to provide a novel and useful generation management system and method for managing resource generation.

Another and more specific object of the present invention is to provide a generation management system and method that facilitate the process of generation management.

Another object of the present invention is to provide a generation management system and method that creates line-number change information in which the lines in the pre-edit software are compared with lines in the post-edit software, wherein the line numbers of the pre-edit software are changed to new line numbers corresponding to the line numbers of the post-edit software to create intermediate pre-edit software in such a manner that the lines of the pre-edit software having no correspondence to the post-edit software are left as they are in the intermediate pre-edit software. The history information is then created by comparing the intermediate pre-edit software and the post-edit software on the line-by-line basis. According to the present invention, it is possible to reduce the amount of information contained in the history information, and the management of resources based upon the history information is substantially facilitated.

Another object of the present invention is to provide a generation management system and method for managing software resources, wherein intermediate pre-edit software and intermediate post-edit software are created respectively from pre-edit software and post-edit software such that both of said intermediate pre-edit software and intermediate post-edit software include the same number of blank spaces. By comparing the intermediate pre-edit software and the intermediate post-edit software thus created, it is possible to create history information such that the history information does not make record of any insubstantial modification in which only the number of blank spaces is changed before and after the edition of the software. As a result, the amount of information contained in the history information is substantially reduced.

Another object of the present invention is to provide a generation management system for managing software resources in a computer, comprising:

memory means for holding generation management data set that includes: original-generation software used as a reference of software management, said original-generation software including a plurality of lines having respective line numbers; history information indicative of the history of modification of said original-generation software; and line-number history information indicative of the history of change of the line numbers in said original-generation software;

editor means for editing pre-edit software created from said generation management data set and including therein a plurality of lines carrying respective descriptions and having respective line numbers, to create post-edit software, such that said post-edit software includes therein a plurality of lines carrying respective descriptions and having respective line numbers in a state that said plurality of lines of said post-edit software are renumbered;

renumbering information creation means for creating renumbering information in which line numbers of pre-edit software and the line numbers of said post-edit software are compared with each other such that a line of said post-edit software for a description corresponds to a line of said pre-edit software for an identical description;

history information creation means for creating said history information based upon comparison of said pre-edit software and said post-edit software;

wherein said history information creation means creates intermediate pre-edit software based upon said renumbering information, such that the line number of said pre-edit software for such a line carrying a description corresponding to a line of the post-edit software, is changed to be coincident to the line number of the corresponding line of the post-edit software, and such that the line number of said pre-edit software for such a line carrying a description not corresponding to a line in the post-edit software, is left unchanged, and wherein said history information creation means creates said history information by comparing each line of said intermediate pre-edit software and each line of said post-edit software.

According to the present invention, it is possible to reduce the amount of information contained in the history information even in the case in which the software development is conducted in the distributed environment and there occurs a substantial discrepancy between the content of the original-generation software held in the host computer and the content of the post-edit software in the workstation. As a result, an efficient and reliable generation management becomes possible. By providing blank space modification means to the generation management system for setting the number of blank spaces to be equal in each of said pre-edit and post-edit software, it becomes possible to eliminate creation of unnecessary history information that treats mere addition of blanks as creation of new generation software.

Other objects and further features of the present invention will become apparent from the following detailed description when read in conjunction with attached drawings.

BRIEF DESCRIPTION OF THE DRAWINGS

FIGS. 2A–2C are diagrams showing examples of software in the various stage of the edit process;

FIG. 3 is a block diagram showing the construction of a conventional system for generation management of software;

FIGS. 5A–5C are diagrams showing various state of the software in the process of the generation management;

FIGS. 13–18 are flowcharts showing the various steps of the generation management corresponding to the process of FIGS. 10–12;

FIGS. 19A–19F are diagrams showing the process for creating line-number history information.

DETAILED DESCRIPTION OF PREFERRED EMBODIMENTS

Figure 1:
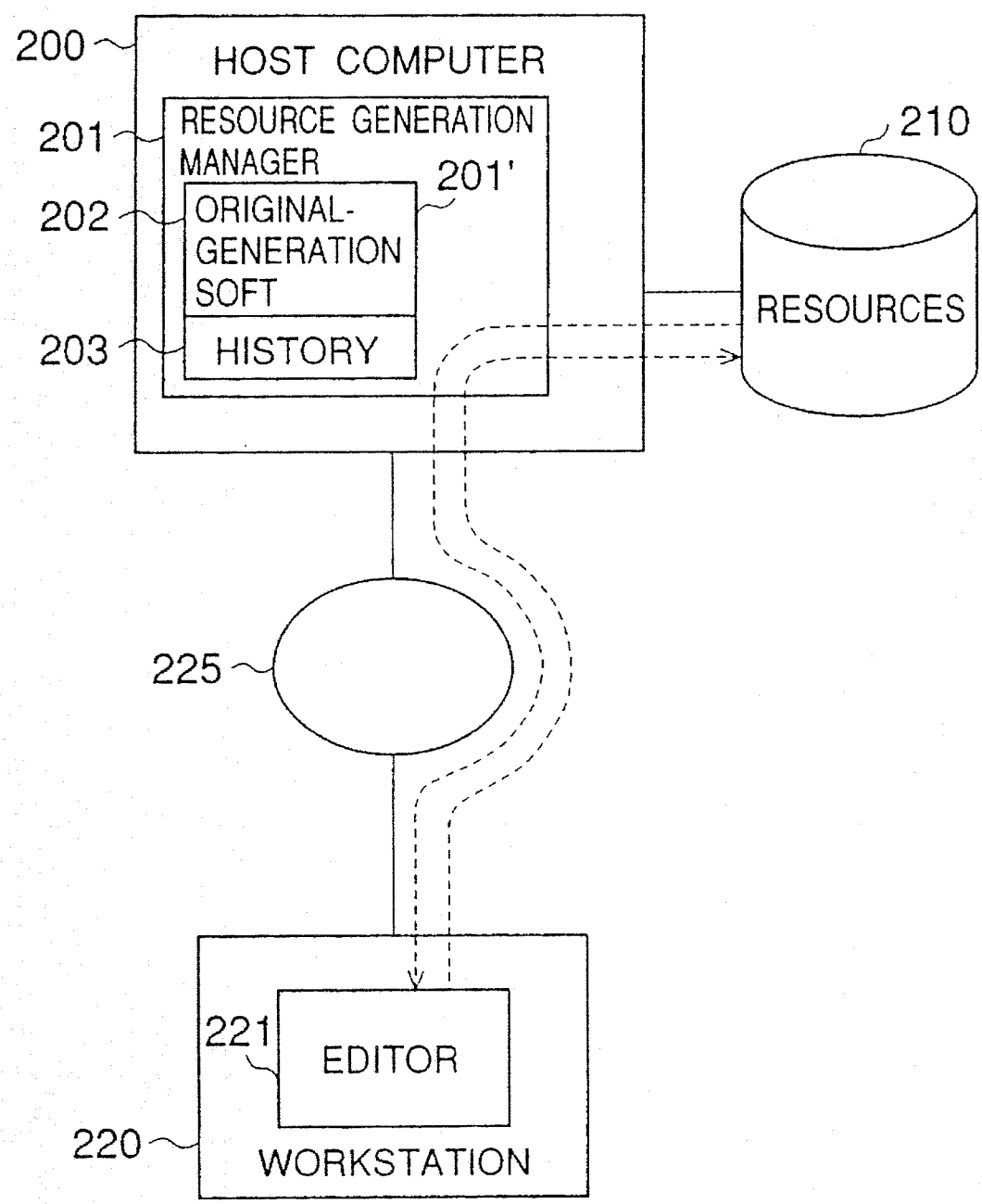
FIG. 1 is a block diagram showing the construction of a conventional computer system used for generation management.
Figure 4:
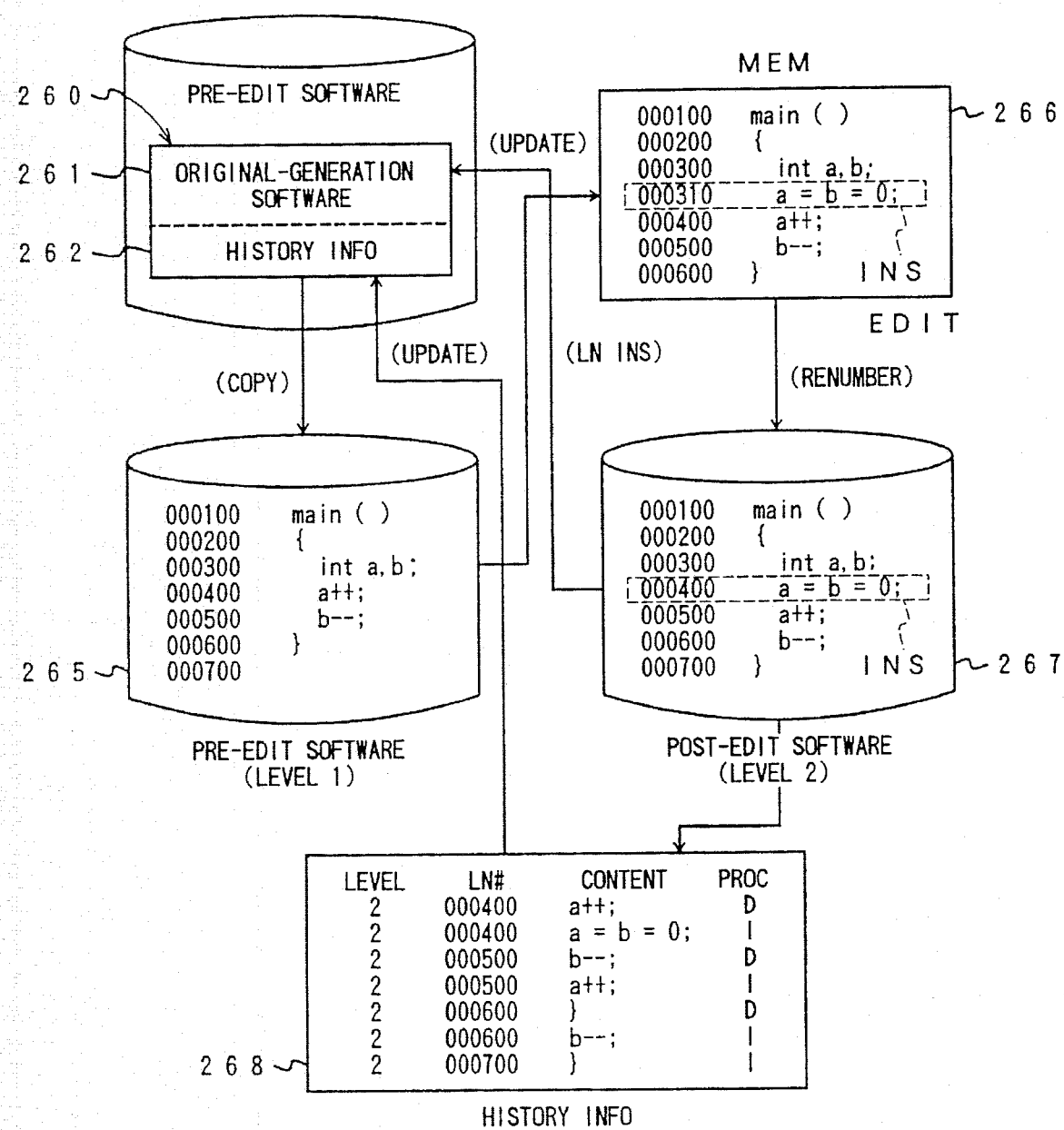
FIG. 4 is a diagram showing the process of line-number management carried out by the system of FIG. 3.
Figure 6:
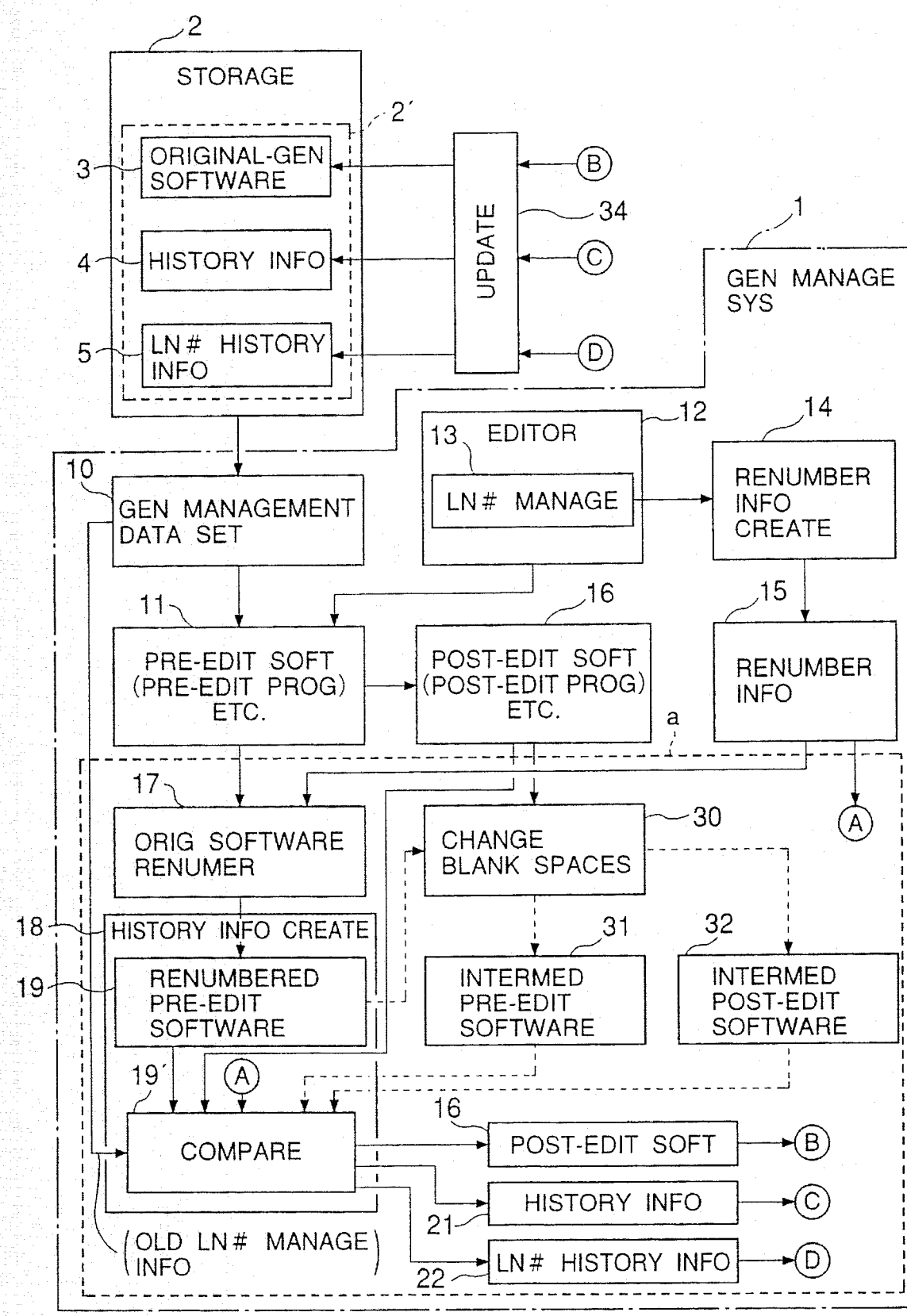
FIG. 6 is a block diagram showing the construction of a computer system used in the present invention for generation management of software.

FIG. 6 shows the principle of the present invention, wherein FIG. 6 shows a generation management system 1 that is provided in a workstation except for a part designated by the symbol "a" and surrounded by a broken line. The part "a" may be provided in any of the workstation and a host computer.

The generation management system 1 cooperates with a storage device 2 of the host computer, wherein the storage device 2 stores therein software resources including generation management data set 2'. It should be noted that the generation management data set 2' includes original-generation data 3 used as a basis or reference of the next-generation software, history information 4 indicative of the history of the original-generation software 3, and line-number history information 5 indicative of the history of line numbers in the original-generation software.

The generation management system 1, in turn, includes a storage device 10 of a workstation for storing the generation management data set imported or copied from the storage device 2 of the host computer at the beginning of the edition. Based upon the generation management data set in the storage device 10, software to be edited such as a program or form, is expanded in a memory of the workstation in the form of pre-edit software 11, and the pre-edit software 11 thus expanded in the memory 11 is edited by means of an editor 12. As a result of edition applied to the pre-edit software 11 as such, post-edit software 16 is created. The post-edit software 16 may include programs and forms.

It should be noted that the editor 12 includes a line-number management unit 13 that achieves a line-number management during the edit process, wherein the edit process typically includes processes such as insertion of a line, deletion of a line, and renumbering of lines. Further, there is provided a renumbering information creation unit 14 that creates renumbering information 15 by comparing the line number of the lines in the post-edit software 16 with the line number of corresponding lines of the pre-edit software 16. As a result of the comparison, the renumbering information 15 is obtained.

Further, there is provided a line-number modification unit 17 for changing the line number of the pre-edit software 11, such that the line number of a line in the pre-edit software 11 is changed to the line number of the line of the post-edit software 16 that carries a corresponding description. Thus, the line-number modification unit 17 creates intermediate pre-edit software 19 in which the line number is changed in accordance with the line number of the post-edit software 16 for those lines that carries a description common to the description of the post-edit software 16.

The line number of the intermediate pre-edit software 19 thus created is compared with the line number of the post-edit software 16 in a history information creation unit 18, wherein the history information creation unit 18 compares the intermediate pre-edit software 19 and the post-edit software 16 line by line and creates history information 21 indicative of discrepancy therebetween. For this purpose, the history information creation unit 18 includes a comparison unit 19'. As a result of the comparison, the history information creation unit 18 further creates line-number history information 22 for the line number change, based upon the comparison with the intermediate pre-edit software 19 and the renumbering information 15, in addition to the foregoing history information 21 as well as the post-edit software 16.

The post-edit software 16, history information 21 and the line-number history information 22 for the line number change, are supplied to an update unit 34, and the update unit 34 updates the generation management data set 2' in the storage device 2 of the host computer 2 by the post-edit software 16 as well as by the history information 21 and 22.

Further, the system of FIG. 6 includes a blank space modification unit 30 for modifying the number of blanks in each line to a predetermined number. The blank space modification unit 30 acts upon pre-edit software 31 representing a state of the software before the change of the blank spaces is made, and creates post-edit software 32 in which the number of blank spaces is set to the aforementioned predetermined number. The pre-edit software 31 and the post-edit software 32 are supplied to the comparison unit 19', and the comparison unit 19' produces the post-edit software 16, as well as the history information 21 and 22 similarly as before.

Figure 7:
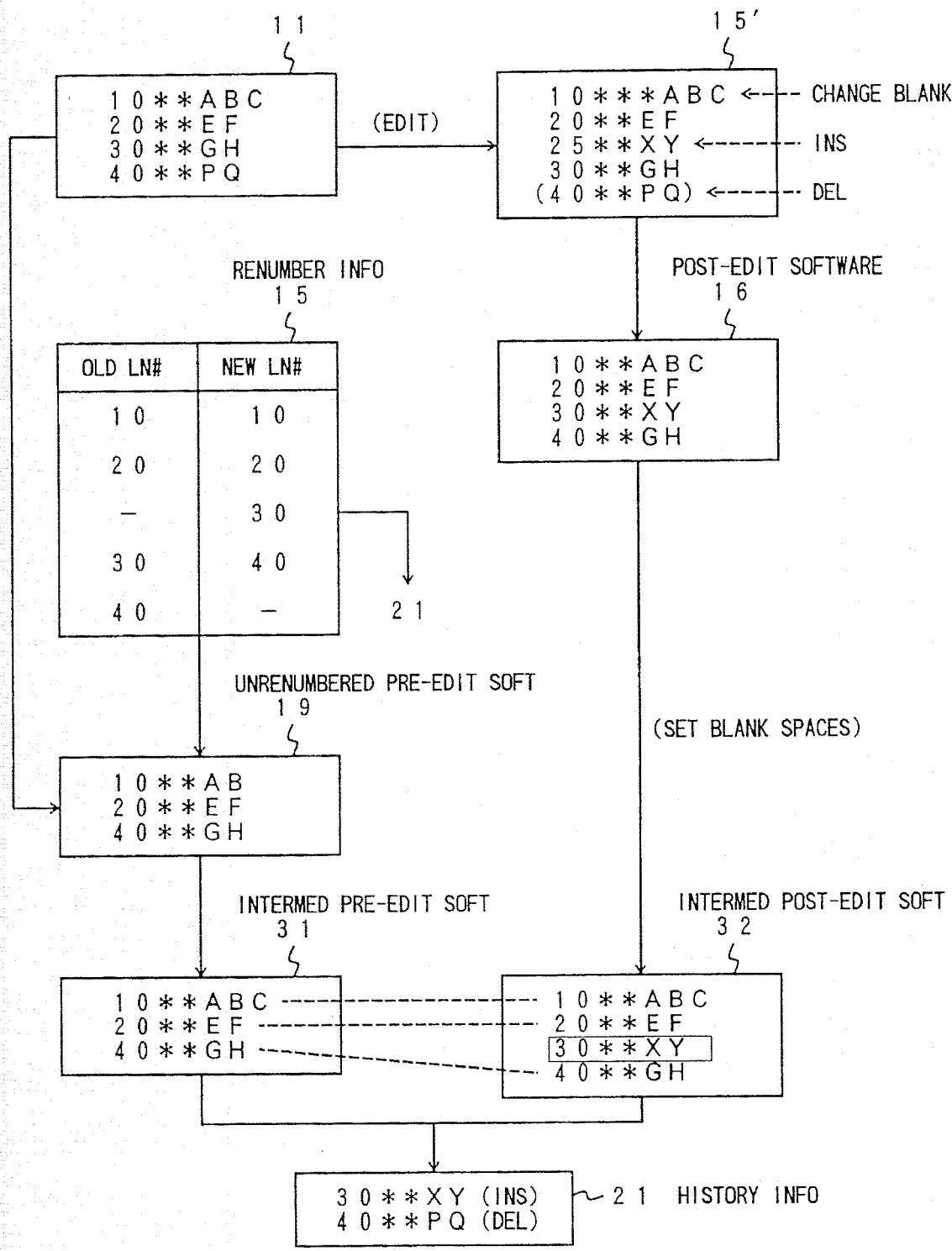
FIG. 7 is a diagram showing the software in the various stages of generation management conducted by the system of FIG. 6.

Next, the operation of the system of FIG. 6 will be described in more detail with reference to FIG. 7, wherein FIG. 7 includes the process for changing the number of blank spaces by way of the unit 30.

In operation, the generation management data set 2' is copied from the storage device 2 and is held in the storage device 10 of the workstation. Further, pre-edit software 11 is created from the copied generation management data set 2' together with renumbering information 15, wherein the renumbering information 15 includes only the line numbers of the pre-edit software 11 in the state that the pre-edit software 11 is expanded in the memory of the workstation as indicated in FIG. 7. It should be noted that the pre-edit software 11 includes blank spaces (represented by "*") in each of the lines #10–#40.

The pre-edit software 11 is then subjected to an edit process by the editor 12, and intermediate software 15' is obtained as a result, wherein it will be noted that a blank space is added to the line #10 in the intermediate software 15'. Further, a new line #25 is added, and the line #40 is deleted.

The intermediate software 15' is then subjected to a renumbering process in the unit 13 of the editor 12, and the post-edit software 16 is created as a result. It should be noted that the renumbered lines of the post-edit software 16 includes lines #10–#40. It should be further noted that the description "ABC" at the line #10 of the pre-edit software 11 corresponds to the description "*ABC" at the line #10 of the post-edit software 16, the description "EF" at the line #20 of the pre-edit software 11 corresponds to the description "EF" at the line #20 of the post-edit software 16, the description "GH" at the line #30 of the pre-edit software 11 corresponds to the description "GH" at the line #40 of the post-edit software 16. Further, there is no line in the post-edit software 16 that corresponds to the description "PQ" at the line #40 of the pre-edit software 11. The correspondence of the lines between the pre-edit software 11 and the post-edit software 16 is summarized in the form of the renumbering information 15 according to the content or description of the lines.

Further, the unit 17 of FIG. 6 refers to the renumbering information 15 for discrepancy between the old line number and the new line number. There, those lines that lack the new line number counterpart are recorded in the history information 21 together with the content of the line and further with a designation indicative of an insertion of a line. Similarly, those lines that lack the old line number counterpart are recorded in the history information 21 together with the content of the line and further with a designation indicative of deletion of a line. Furthermore, those lines that include both the old line number counterpart and the new line number counterpart are extracted and subjected to renumbering to create the intermediate pre-edit software 19. It should be noted that the lines in the renumbering information 15 that have both new line number counterpart and old line number counterpart have a possibility that an edition has been made. Thus, the line #30 of the pre-edit software 11 for the description "**GH" is renumbered to the line #40 in the intermediate pre-edit software 19.

The blank space modification unit 30 sets the number of blank spaces in each line of the intermediate pre-edit software 19 at a predetermined number, and creates second intermediate pre-edit software 31. In the illustrated example, the number of blank spaces is set to one in the second intermediate pre-edit software 31. Further, the blank space modification unit 30 acts upon the post-edit software 16 to create second post-edit software 32 wherein the number of blank spaces is set to one.

The second intermediate pre-edit software 31 and the second post-edit software 32 are then compared with each other line by line in the history information creation unit 18, and the history information 21 is created as a result of the comparison. In the example of FIG. 7, the lines #10 and #20 are common in both of the pre-edit software 11 or 31 and the post-edit software 16 or 32, and no modification is recorded in the history information 21.

In the history information 21, only those lines in which the content is different between the pre-edit software and the post-edit software are recorded as modification. Thus, the absence of the counterpart line in the post-edit software 16 or 32 is recorded unconditionally to the history information 21 as "Deletion," as already noted. Similarly, the absence of the counterpart line in the pre-edit software 19 or 31 is recorded unconditionally to the history information 21 as "Insertion."

It should be noted that the comparison unit 19' compares the lines of the pre-edit software 31 and the post-edit software 32, starting from the first line, while referring to the renumbering information 15. More specifically, the comparison unit 19' first refers to the renumbering information 15 for a line that includes both the old line number and the new line number. It should be noted that those lines that lack one of the counterpart line numbers are already considered that insertion or deletion of a line has been made, and there is no need for further comparison of the contents of the lines for detection of insertion or deletion. Thus, the comparison unit 19' checks for the content of the lines having both the old and new line numbers thus detected, by comparing the content of the pre-edit software 31 and the post-edit software 32.

Thus, the lines #10 and #20 pass the comparison test for the discrepancy and no record is made to the history information. It should be noted that these lines #10 and #20 are included commonly in both of the pre-edit software 11 and the post-edit software 16 in the renumbering information 15 and have the same content in the pre-edit software 31 and in the post-edit software 32.

Further, the comparison unit 19' checks for the next lines of the renumbering information 15 and finds out the existence of corresponding, old and new line numbers in the pre-edit software 11 and the post-edit software 16 at the line #40. Thus, the comparison unit 19' compares the content of the line #40 by checking the description of the current line, line #40, of the pre-edit software 31, and the current line, line #40, of the post-edit software 32. As the content of the line #40 is identical between the pre-edit software 31 and the post-edit software 32, no record is made to the history information 21.

Further, the history information creation unit 18 creates the line-number history information 22 by updating the original line-number history information 5 by the newly created renumbering information 15.

Alternatively, one may compare the content of the old line number and the new line number of the renumbering information 15 line by line to create the history information 21.

The post-edit software 16, the history information 21 and the line-number history information 22 are then transferred to the host computer, and the update unit 34 updates the generation management data set 2' in response thereto.

According to the construction of the present invention set forth above, one can achieve the generation management of software resources with reduced amount of history information. Further, those unsubstantial changes such as the change of line numbers or blank spaces that do not affect the operation of the system, are omitted from the history information.

Figure 8:
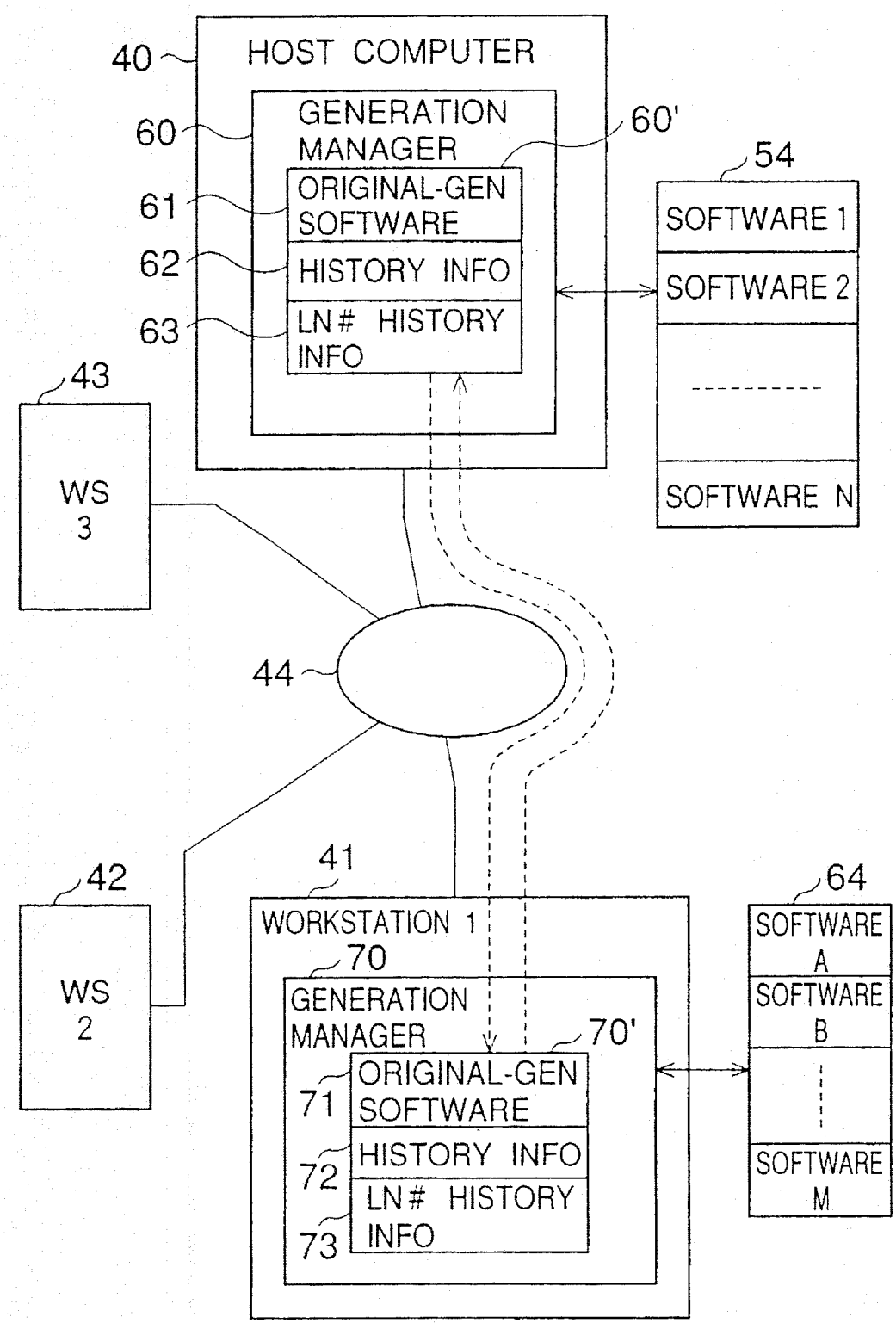
FIG. 8 is a block diagram showing the construction of a computer system used in the present invention for generation management.

FIG. 8 shows a computer system to which the present invention is applied.

Referring to FIG. 8, the computer system includes a host computer 40 and workstations 41–43 connected to the host computer 40 by way of a network 44. The host computer 40 has a storage device 54 for storing software resources managed integrally by the host computer 40. For this purpose, the host computer 40 includes a software resource manager 60, wherein the software resource manager 60 includes generation management data set 60', original-generation software 61, history information 62 and line-number history information 63.

In order to implement the present invention described above, it should be noted that the workstation is required to have the post-edit software and the line-number history information at least. Alternatively, the workstation 41 may have a storage device 64 for storing various software used in the workstation 41, similarly to the host computer. Further, the workstation 41 may include a software generation manager 70 for the generation management of software, wherein the software generation manager 70 includes generation management data set 70', original-generation software 71 such as post-edit software, history information 82 created based upon the post-edit software 72, and line-number history information 73 created as a result of the renumbering process.

Figure 9:
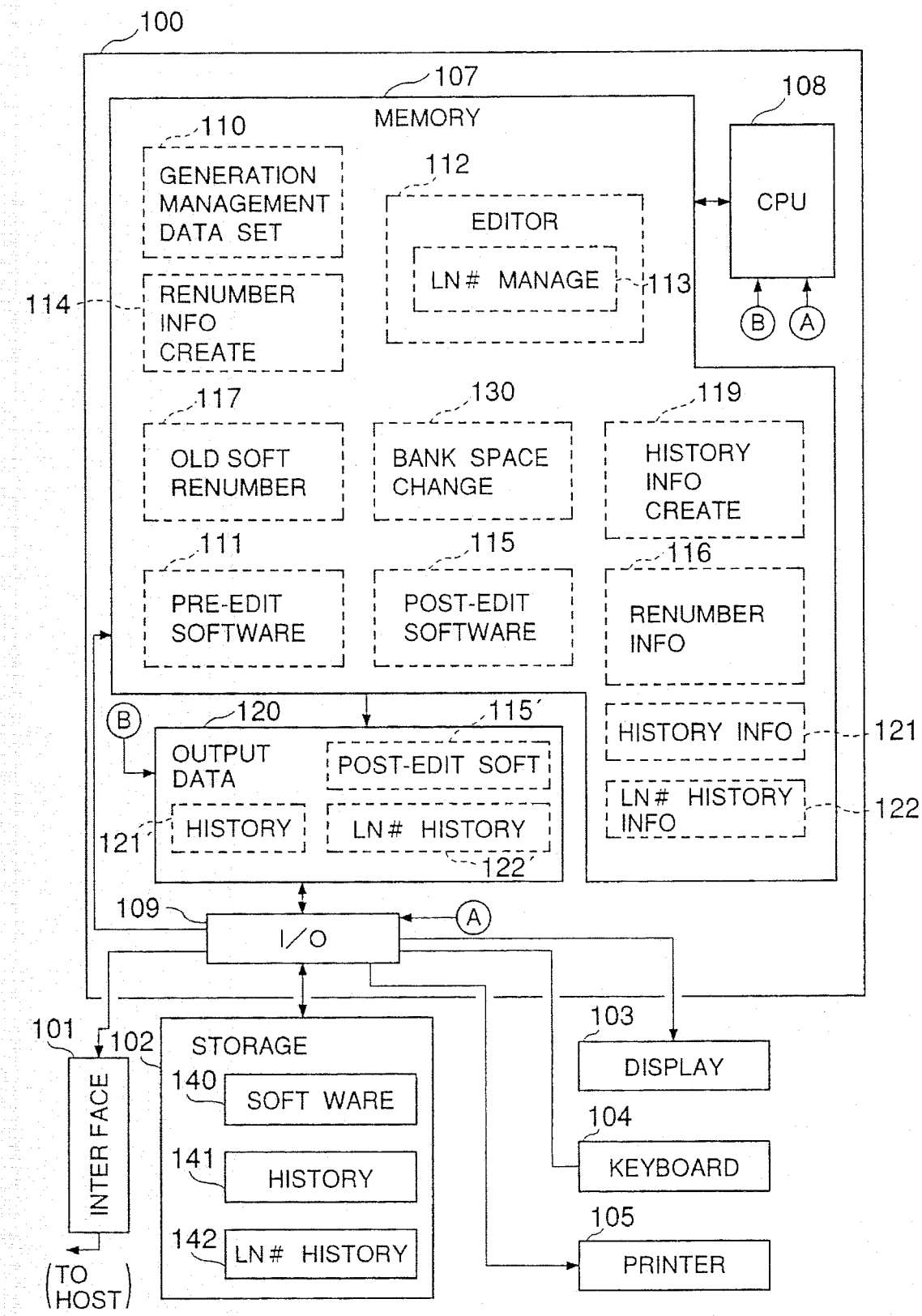
FIG. 9 is a block diagram showing the construction of a workstation used in the computer system of FIG. 8 for generation management of software resources.

FIG. 9 shows an embodiment of the workstation used in the system of FIG. 8.

Referring to FIG. 9, the workstation includes a computer 100 and a network interface 101 connected to the host computer 40 via the network 44 for exchanging various data between the computer 100 and the host computer 40. Further, the workstation includes a storage device 102 corresponding to the storage device 64 for storing various software as well as various other peripheral devices such as a display 103, an inputting device 104 such as a keyboard, and a printer 105.

The computer 100 of the workstation has a memory 107 and a processor 108, as well as an input/output controller 109, wherein the input/output controller 109 achieves an input/output control between the computer 100 and the storage device 102, the display device 103, and the like.

It should be noted that the memory 107 includes various areas for holding a generation management data set 110 copied from the host computer 40, pre-edit software 111 corresponding to the pre-edit software 11 in the state that the pre-edit software 111 is expanded, an editor program 112 corresponding to the editor 12, a line-number management program 113 that forms a part of the program 112 and corresponds to the line-number management unit 13, and a renumbering information creation program 114 corresponding to the renumbering information creation unit 14. Further, the memory 107 includes areas for post-edit software 115 corresponding to the post-edit software 16, renumbering information 116 corresponding to the renumbering information 15, a line-number modification program 117 corresponding to the line-number modification unit 17, a history information creation program 119 corresponding to the history information creation unit 18, history information 121 corresponding to the history information 21, line-number history information 122 corresponding to the line-number history information 22, and a blank space modification program 130 corresponding to the blank space modification program 30.

In addition, the workstation includes an output memory 120 for holding output data, wherein the output memory 120 has areas for post-edit software 115' transferred from the memory 107 and corresponding to the post-edit software 115, history information 121 transferred from the memory 107 and corresponding to the history information 121', and line-number history information 122'0 transferred from the memory 107 and corresponding to the line-number history information 122.

Further, the storage device 102 of the workstation holds therein software 140, history information 141 of the software 140, and line-number history information 142 of the software 140.

Next, the operation of the system of FIG. 9 will be described with reference to FIGS. 10–12.

Figure 10:
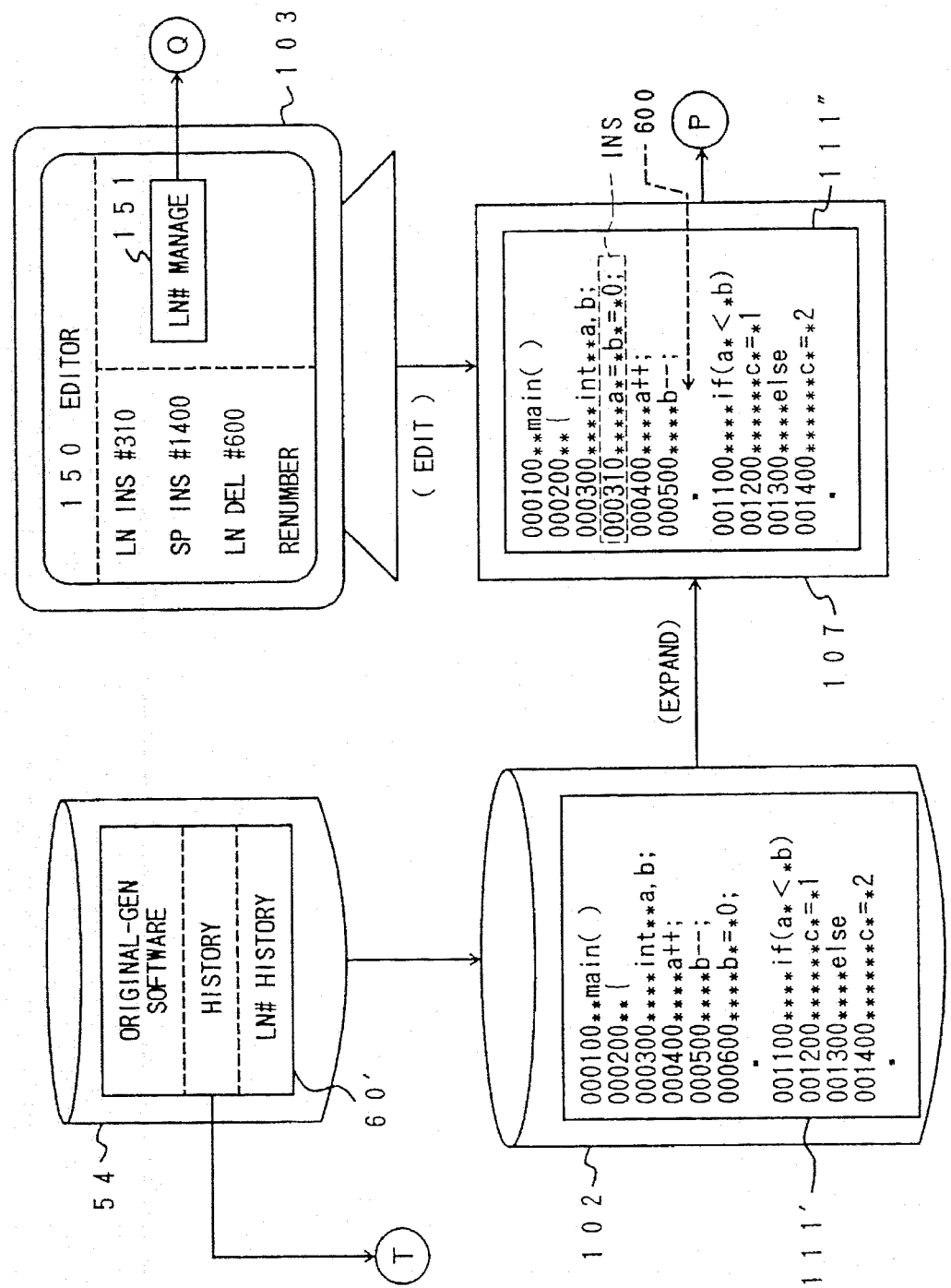
FIGS. 10–12 are diagrams showing various stages of the generation management conducted by the system of FIG. 9.

Referring to FIG. 10, the storage device 54 of the host computer stores the software resources managed by the host computer as already described, wherein the storage device 54 stores therein the generation management data set 60'. On the other hand, the storage device 102 of the workstation stores therein pre-edit software 111' created from the generation management data set 60' copied from the host computer. The pre-edit software 111' in the storage device 102 is expanded in the memory 107 as indicated, wherein FIG. 10 shows a state in which a space is inserted to the line #1400, the line #310 is inserted and line #600 is deleted as a result of the edition by the editor program 150 as schematically indicated in the display 103. It should be noted that the edition by the editor program 150 includes the renumbering of the lines by way of the line-number-management program 151.

Figure 11:
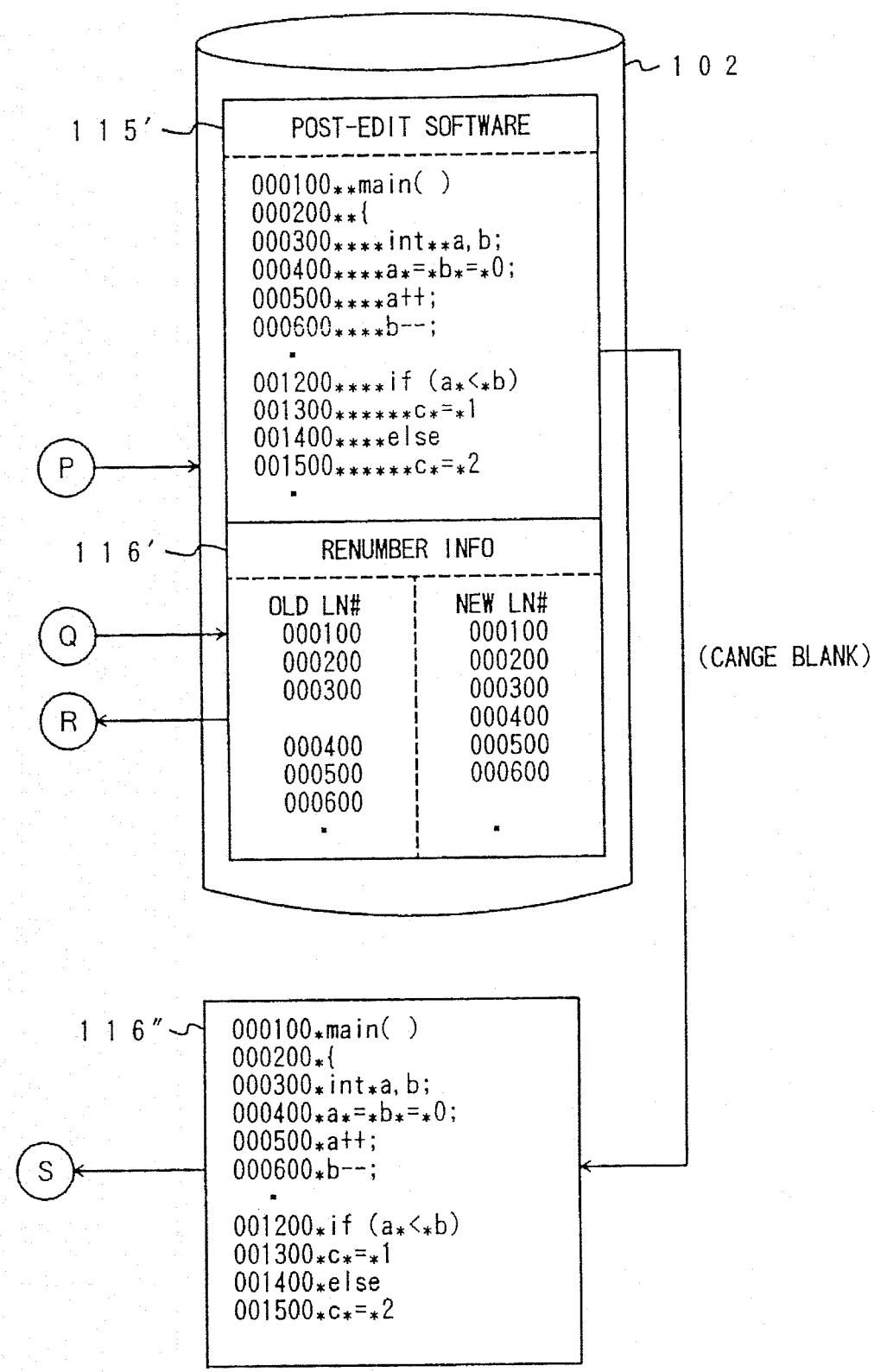
Figure 12:
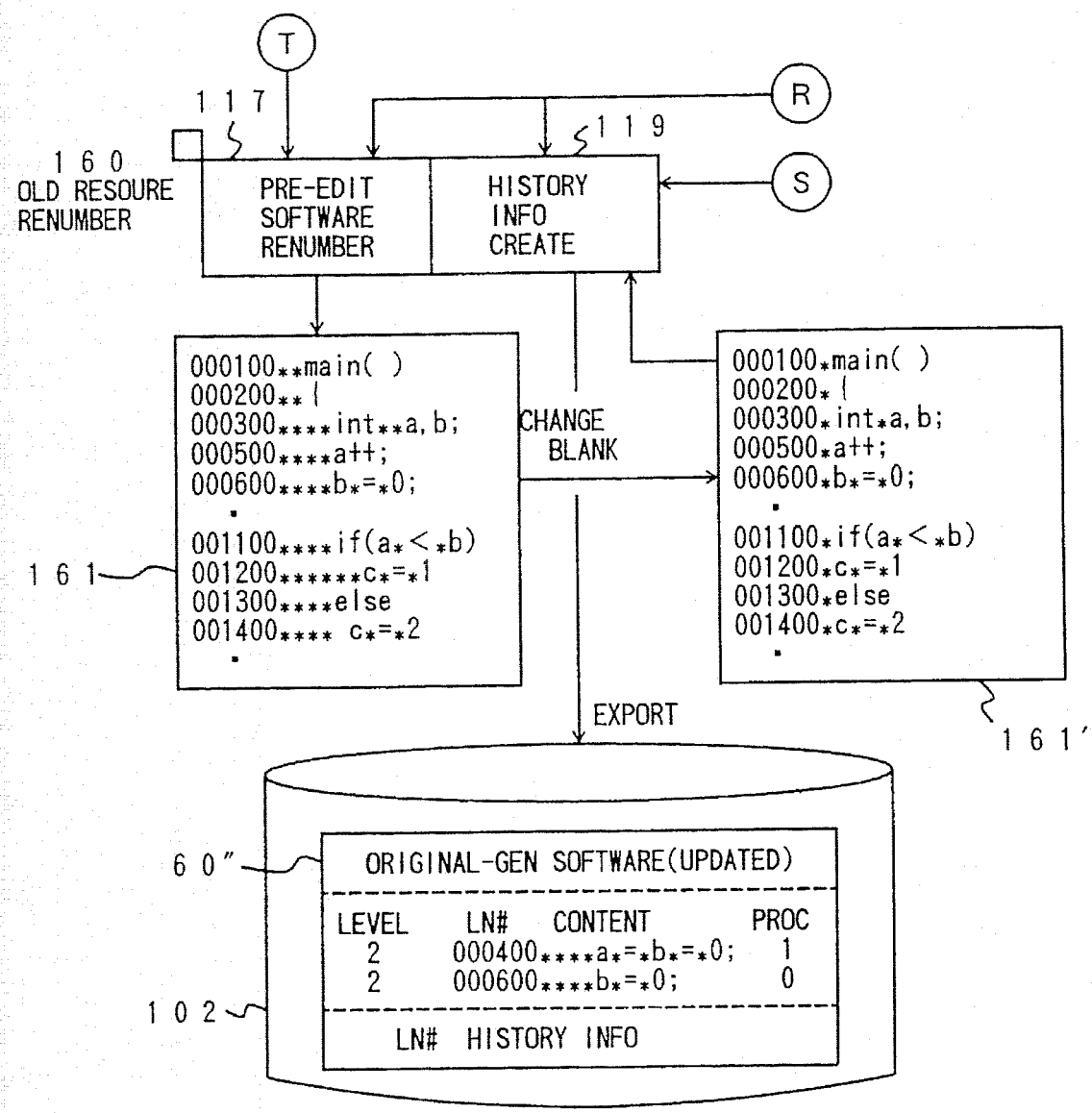

As a result of edition and renumbering, post-edit software 115' is obtained and stored in the storage device 102 of the workstation, together with the renumbering information 116' as indicated in FIG. 11. Similarly to the renumbering information 15 of FIG. 7, the renumbering information 116' compares the line number of the pre-edit software 111' and the post-edit software 115' for each description.

Thus, the description having the line number 100 in the pre-edit software 111' corresponds to the description also having the line #100 in the post-edit software 115'. Similarly, the lines #200 and #300 of the pre-edit software 111' correspond respectively to the lines #200 and #300 of the post-edit software 115'. On the other hand, the line #400 of the post-edit software 115' corresponding to the line inserted as a result of the edition, does not have corresponding description in the pre-edit software 111'. Thus, the line #400 of the pre-edit software 111' corresponds to the line #500 of the post-edit software 115', the line #500 of the pre-edit software 111' corresponds to the line #600 of the post-edit software 115'. Further, the line #600 of the pre-edit software 111' lacks a counterpart line in the post-edit software 115', as the line #600 is the line deleted as a result of the edition. Further, from the post-edit software 115', another post-edit software 116" is created such that each line includes a single blank space.

It should be noted that the pre-edit software 111' is supplied from the storage device 54 of the host computer or from the storage device 102 of the workstation, to the remembering program 117, wherein the line number of the pre-edit software 111' is changed in accordance with the line number of the post-edit software 115' that is subjected to the renumbering process after the edition. As a result, the renumbering program 117 creates intermediate pre-edit software 161 based upon the renumbering information 116' such that the line number of the lines in the pre-edit software 161 corresponds to the post-edit software 115'. In the intermediate pre-edit software 161, it should be noted that the original line #600 for the description "****b*=,0," which has been deleted as a result of the edition, is given a line #D00600 indicating that the line is deleted in the post-edit software. The renumbering program 117 forms, together with the history information creation program 119, a renumbering unit 160.

Further, the intermediate pre-edit software 161 thus created is then subjected to the blank space adjustment process by the blank space modification program 130 to create another intermediate pre-edit software 161' such that each line includes only one blank space. The pre-edit software 161' and the post-edit software 116" are then supplied to the history information creation program 119 wherein the history information creation program 119 creates the history information 121 by comparing the software 161' and the software 116" as described already, wherein the history information 121 thus created is stored in the storage device 102 of the workstation as the newest generation management data set 60", together with the line-number history information not shown and the post-edit software 115'. The generation management data set 60" thus created is then transferred to the host computer 40 for updating the generation management data set 60' held therein.

Figure 13:
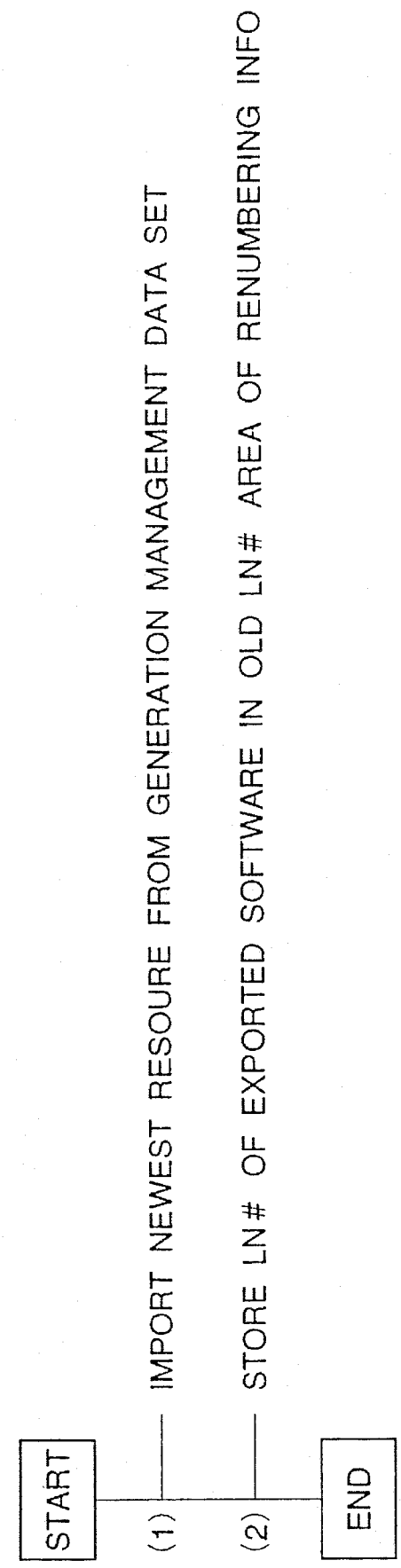

Next, the step by step operation of the generation management system of the present invention will be describe with reference to the flowcharts of FIGS. 13–18, wherein FIG. 13 is a flowchart showing the process for creating the pre-edit software 111' from the generation management data set 60'.

Referring to FIG. 13, the workstation 41 copies the generation management data set 60' from the storage device 54 of the host computer to the storage device 102 of the workstation in a step (1). From the generation management data set 60' thus copied, the pre-edit software 111' is expanded on the memory 107 of the workstation.

Next, in a step (2), the line number of the lines in the pre-edit software 111' is set in the renumbering information 116'. In the state in which the pre-edit software 111' is just expanded from the generation management data set 60", the area for new lines is blank in the renumbering information 116'.

Figure 14:
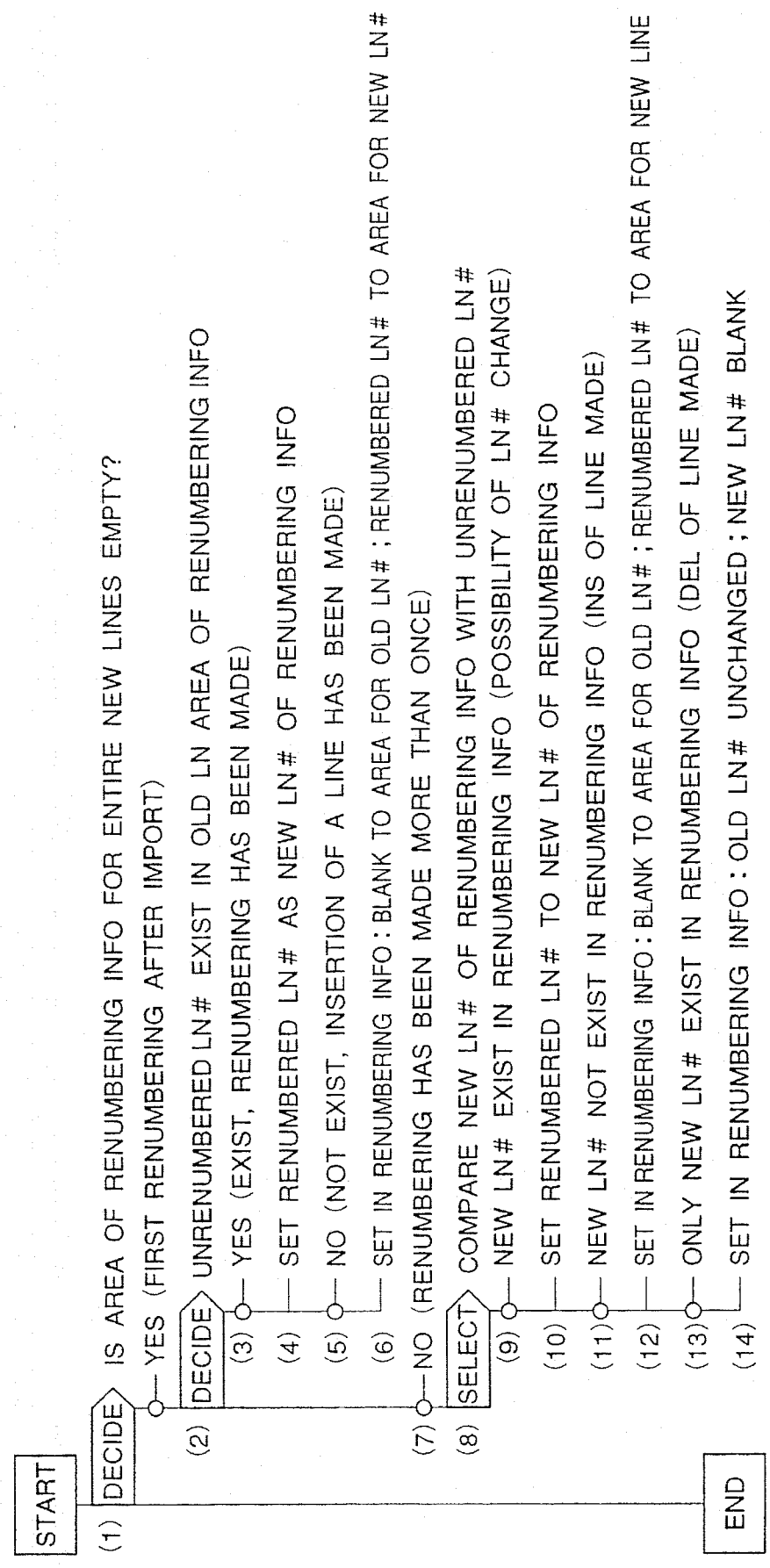

FIG. 14 shows the flowchart for renumbering the post-edit software 115'.

Referring to FIG. 14, a discrimination is made in a step (1) whether or not the entire area of the renumbering information for the new lines is blank. In other words, a discrimination is made in the step (1) whether or not the renumbering process is the one that is made first after the copying of the resource management data set 60' has been made from the host computer 40. If the result is YES, a step (2) is conducted for discriminating whether or not the area of the renumbering information for the old line number includes a line number that is not renumbered. In other words, comparison is made between the pre-edit software 111' and the post-edit software 111" prior to the renumbering process shown in FIG. 10 in the step (2).

If the result of the step (2) is YES as indicated in a step (3), this indicates a situation in which the line such as "#000100" of the post-edit software 111" exists in the area of the old line number of the renumbering information 116'. In such a case, there is a possibility of change being made to the line as a result of the edition. The line number of the post-edit software 115' after the renumbering process is set to the area of the renumbering information for new line number, as indicated by a step (4).

On the other hand, if the result of the step (2) is NO as indicated in a step (5), this indicates that an insertion of a line has been made. It should be noted that the inserted line "#000310" of the post-edit software 111" is not included in the old line number of the pre-edit software 111'. Thus, a step (6) is conducted in which a line number after the renumbering process such as "#000400" is set to the area for new line number, while simultaneously setting a blank space to the area for the corresponding old line number.

If the result of discrimination of the step (1) is NO in a step (7), indicating that renumbering has already been made at least once, the new line number in the renumbering information 116' and the line number before the renumbering process such as the line number in the post-edit software 111" of FIG. 10, are compared in a step (8).

If it turned out, as a result of the step (8), that there exits a new line number in the renumbering information 116' in a step (9), indicating that renumbering has been made, the line number after the renumbering process such as the one in the post-edit software 115' is set to the area for new line number of the renumbering information 116', in a step (10).

When the result of the step (8) indicates that there exist no new line number in the renumbering information 116' corresponding to the line number in the post-edit software 111', as in the case of the line "#000310," in a step (11), this indicates that a line has been inserted. Thus, a step (12) is conducted wherein a blank space is set to the area for old line number and the renumbered line such as "#000400" is set to the area for new line number.

Further, when the result of the step (8) indicates that only new line number exists in the renumbering information 116' while there is no counter part in the post-edit software 111" as indicated in a step (13), this means that a line has been deleted. For example, the old line "#00600" in the renumbering information 116' has no counterpart in the post-edit software 111". In such a case, the old line number "#000600" is left unchanged in the renumbering information 116' while a blank is set to the area for new line.

FIGS. 15–18 show the process applied to the software exported from the workstation to the host computer based upon the history information created by the host computer. More specifically, FIGS. 15–18 show the process carried out in the memory space for creating the history information.

Figure 15:
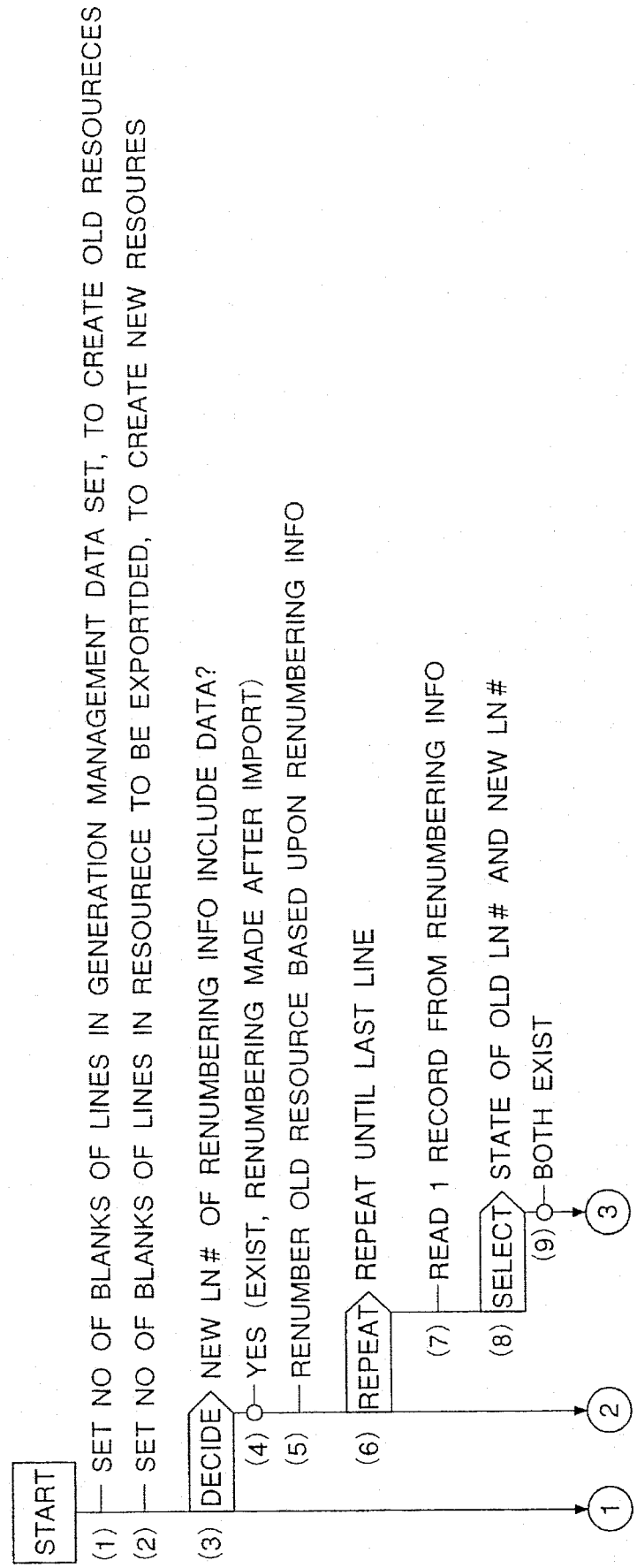

Referring to FIG. 15, a step (1) is conducted, wherein the number of blank spaces in the pre-edit software 161 included in the generation management data set are replaced with a predetermined number of blank spaces to create intermediate pre-edit software 161' in which the number of blank spaces is modified. Next, in a step (2), the number of blank spaces is modified in the post-edit software 115' such that the number of the blank spaces is set to the aforementioned predetermined number. As a result, intermediate post-edit software is created.

Next, a discrimination is made in a step (3) whether or not there exists data for new line number in the renumbering information 116'. If the result of the step (3) is YES in a step (4), this means that the renumbering has been made after import of the software, and the pre-edit software 111' is renumbered in a step (5) based upon the renumbering information 116'.

Further, in a step (7), the renumbering information 116' is read out one record by one record repeatedly until it is confirmed in a step (6) that the last record is read out. In each of the repetitions, a step (8) is conducted for comparing the old line number and the new line number in the renumbering information 116'.

If it is confirmed in a step (9) that both the old line number and the new line number exist in the renumbering information 116', a step (10) of FIG. 16 is carried out for discriminating whether or not the content of the old line number coincides to the content of the new line number.

In the case that the content of the old line number does not coincide to the content of the new line number as in a step (11), indicating that a modification has been made after import of the pre-edit software 111', a step (12) is conducted wherein information indicative of "Deletion made to a line of pre-edit software; Insertion made to a line of post-edit software" is added to the history information 121.

In the case that only the line number for the pre-edit software 111' exists in the renumbering information 116' as in a step (13), this indicates that a line has been deleted from the pre-edit software 111' as a result of the edition. Thus, a step (14) is carried out for setting information indicative of "Deletion made to a line of pre-edit software" in the history information 121.

Further, in the case that only the line number for post-edit software 115' exists in the renumbering information 116' as in a step (15), this indicates that a line has been inserted in the post-edit software 115' as a result of the edition. Thus, a step (16) is conducted for setting information indicative of "Insertion made to a line of post-edit software" in the history information 121.

Figure 17:
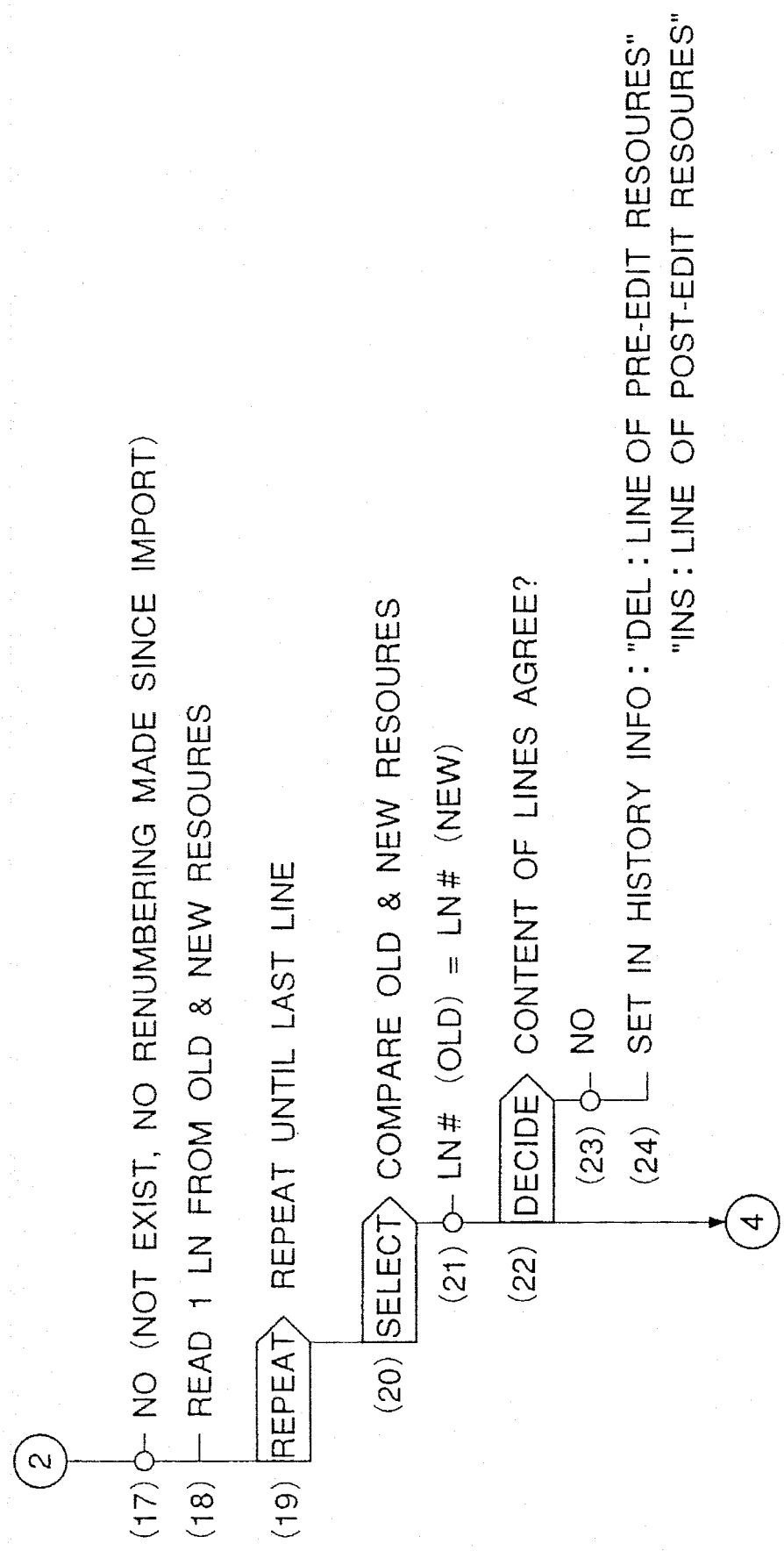

In the event it is discriminated in the step (3) that there is no data in the new line of the renumbering information 116' as indicated in a step (17) of FIG. 17, this means that the renumbering process has not been made. Thus, a step (18) is conducted for reading out the content of the pre-edit software 161' and the post-edit software 116" one line by one line.

Further, repetitions are made in a step (19) until to the last line, wherein each repetition includes a step (20) for comparing the lines of the pre-edit software 161' and the post-edit software 116".

In the event that the line number of the pre-edit software 161' agrees to the line number of the post-edit software 116" as indicated in a step (21), a further discrimination is made in a step (22) whether or not the contents of both lines agree to each other. If the result is NO as indicated in a step (23), a record is made to the history information 121 indicating that "Deletion of a line is made to the pre-edit software; Insertion of a line is made to the post-edit software." Next, a step (25) shown in FIG. 18 is conducted for reading a next line from the pre-edit software 111' and from the unrenumbered post edit software 111".

In the event that the line number of the pre-edit software 161' is smaller than the line number of the post-edit software 116" as indicated by a step (26), a step (27) is conducted for entering a record to the history information 121 indicating that "Deletion of a line is made from the pre-edit software." Further, a next line is read from the pre-edit software in a step (28).

In the event that the line number of the pre-edit software 161' is larger than the line number of the post-edit software 116" as in a step (29), a record is made to the history information 121 indicating that "Insertion of line is made in the post-edit software." Further, a step (31) is conducted for reading a next line from the post-edit software 116".

After the foregoing steps (1)–(31), a step (32) is conducted for updating the generation management data set in the storage device 102 by the newest generation management data set 60". Further, a step (33) is conducted for adding the history information created in the foregoing processes to the history information in the generation management data set 60". Further, a step (33) is conducted for updating the renumbering information in the generation management data set 60" by the newest renumbering information.

The generation management data set 60" is then exported to the host computer 40 by way of the network 44.

FIGS. 19A–19F show the process of creating the line-number history information 22 of FIG. 6. A similar process is applied also to the creation of the line-number history information 73 of FIG. 8 or 142 of FIG. 9.

Referring to FIG. 19A, an original or initial line-number history information 5 is retrieved from the generation management data set 2'. In FIG. 19A, it will be noted that the original line-number history 5 indicates the correspondence of the original line number and the current line number, wherein it will be noted that the original line number and the corresponding current line number are identical. After edition and subsequent renumbering of the software in the workstation, on the other hand, the correspondence of the line numbers is changed as indicated in FIG. 19B, wherein it will be noted that FIG. 19B is substantially identical with the renumbering information 15 or 116 shown in FIG. 7 or 9 at least in this stage of software revision in which the updating of the software is applied only once. Thereby, one obtains the updated line-number history information 22 as indicated in FIG. 19C, which is substantially identical with the renumbering information of FIG. 19B.

In the next updating of the software, the line-number history information of FIG. 19C is retrieved from the generation management data set 2' as indicated in FIG. 19D, and renumbering information shown in FIG. 19E is obtained after edition and subsequent renumbering. Thereby, the updated line-number history information shown in FIG. 19F is obtained as a table indicative of the correspondence of the original line numbers and the updated line numbers. Thus, it will be noted that the line-number history information of FIG. 19F is different from the renumbering information of FIG. 19E in that the line-number history information includes the accumulation of the renumbering information.

Figure 20:
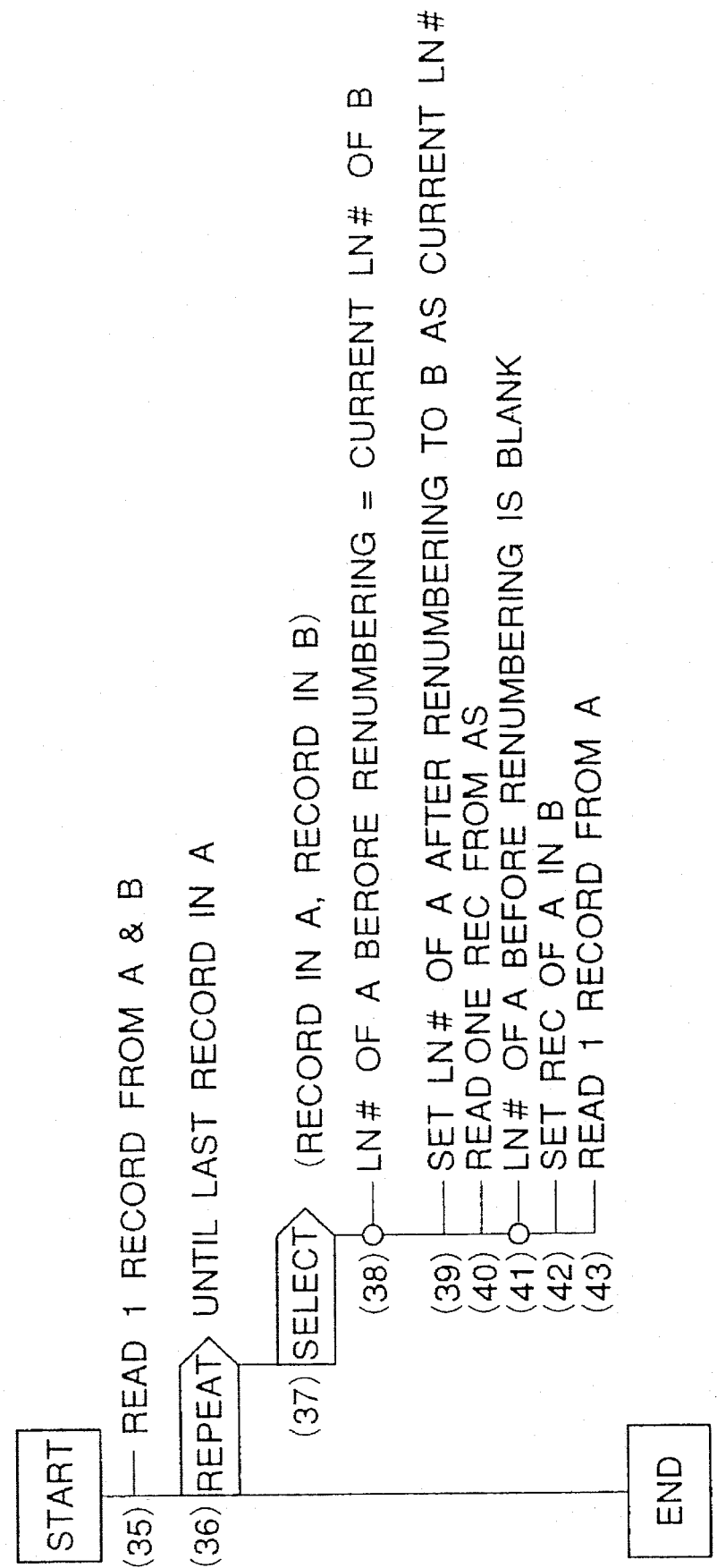
FIG. 20 is a flowchart showing the creation of line-number history information.

FIG. 20 shows the process conducted by the workstation, particularly by the comparison unit 19' of FIG. 6, for creating the line-number history information shown in FIGS. 19A–19F.

Referring to FIG. 20, one record of data is read out in a step (35) from both the renumbering information designated in FIG. 20 as "A" and the original line-number history information designated in FIG. 20 as "B," wherein the reading of the renumbering information conducted repeatedly in a step (36) until to the last line number.

Next, a selection step (37) is conducted based upon the content of the record of the renumbering information A and the content of the line-number history information B. More specifically, when it is identified that the same line number is included before and after renumbering in the renumbering information A in a step (38), indicating the possibility of a line number change as a result of edition, the line number in the renumbering information A after renumbering is entered to the line-number history information B as the current line number in a step (39). For example, the renumbered line "#000100" in the renumbering information of FIG. 19B is entered to the line-number history information of FIG. 19C as the current line number. After this, a step (40) is conducted for reading further records from the renumbering information and the line-number history information.

Further, when it is identified in a step (41) that the line number before renumbering in the renumbering information A is blank, indicating that the line is inserted as a result of edition, the record of the renumbering information A after renumbering is entered to the line-number history information. For example, the line "#000200" of the renumbering information of FIG. 19B is entered to the line number history information of FIG. 19C as the current line number. After this, a step (43) is conducted to read the subsequent record from the renumbering information A. As already noted, the steps (37)–(41) are repeated until the last record or line number is read from the renumbering information A.

Further, the present invention is not limited to the embodiments described heretofore, but various variations and modifications may be made without departing from the scope of the invention.

What is claimed is:

1. A generation management system for managing software resources in a computer, comprising:

memory means for holding generation management data set that includes: original-generation software used as a reference of software management, said original-generation software including a plurality of lines having respective line numbers; history information indicative of the history of modification of said original-generation software; and line-number history information indicative of the history of change of the line numbers in said original-generation software;

editor means for editing pre-edit software created from said generation management data set and including therein a plurality of lines carrying respective descriptions and having respective line numbers, to create post-edit software, such that said post-edit software includes therein a plurality of lines carrying respective descriptions and having respective line numbers in a state that said plurality of lines of said post-edit software are renumbered;

renumbering information creation means for creating renumbering information in which line numbers of pre-edit software and the line numbers of said post-edit software are compared with each other line by line such that a line of said post-edit software for a description corresponds to a line of said pre-edit software for an identical description;

history information creation means for creating said history information based upon comparison of said pre-edit software and said post-edit software;

wherein said history information creation means creates renumbered pre-edit software based upon said renumbering information, such that the line number of said pre-edit software for such a line carrying a description corresponding to a line of the post-edit software, is changed to be coincident to the line number of the corresponding line of the post-edit software, and such that the line number of said pre-edit software for such a line carrying a description not corresponding to a line in the post-edit software, is left unchanged, and wherein said history information creation means creates said history information by comparing each line of said renumbered pre-edit software and each line of said post-edit software.

2. A generation management system as claimed in claim 1, wherein said generation management system further comprises blank space modification means for modifying the number of blank spaces in a line of software to a predetermined number.

3. A generation management system as claimed in claim 2, wherein said blank space modification means produces intermediate pre-edit software from said renumbered pre-edit software by setting the number of blank spaces in each line of said renumbered pre-edit software, said blank space modification means further produces intermediate post-edit software by setting the number of blank spaces in each line of said post-edit software; and wherein said history information creation means creates said history information by comparing each line of said intermediate pre-edit software and each line of said intermediate post-edit software.

4. A generation management system as claimed in claim 1, wherein said history information creation means creates line-number history information based upon a comparison of an old line-number history information included in said generation management data set and said renumbering information created by said renumbering information creation means.

5. A generation management system as claimed in claim 1, wherein said history information creation means compares said renumbered pre-edit software and said post-edit software line by line, such that said history information creation means records an insertion of line to said history information when the line number of a line of said post-edit software is smaller than the line number of a corresponding line of said renumbered pre-edit software, said history information creation means thereby compares the content of said line of said renumbered pre-edit software with the content of a next line of said post-edit software for detection of modification; said history information creation means further records a deletion of line to said history information when the line number of a line of said post-edit software is larger than the line number of a corresponding line of said renumbered pre-edit software, said history information creation means thereby compares the content of said line of said post-edit software with the content of a next line of said renumbered pre-edit software for detection of modification.

6. A generation management system as claimed in claim 1, wherein said history information creation means creates said history information by referring to said renumbering information line by line, said history information creation means recording an insertion of line in said history information when a line of said renumbering information for said post-edit software lacks a counterpart line for said pre-edit software, said history information creation means recording a deletion of line in said history information when a line of said renumbering information for said pre-edit software lacks a counterpart line of said post-edit software, wherein said history information creation means records said insertion of line to said history information together with the content of said inserted line, and wherein said history information creation means records said deletion of line to said history information together with the content of said deleted line.

7. A generation management system as claimed in claim 6, wherein said history information creation means compares a line of said pre-edit software and a corresponding line of said post-edit software in the event that said renumbering information indicates a correspondence between said line of said pre-edit software and said line of said post-edit software, for detection of any discrepancy in the content between said line of said pre-edit software and said post-edit software.

8. A generation management system as claimed in claim 1, wherein said renumbering information creation means compares said pre-edit software and said post-edit software in an unrenumbered state line by line, said renumbering information creation means setting, when the line number of said pre-edit software agrees to the line number of said post-edit software in the unrenumbered state, the line number of said pre-edit software in an area of said renumbering information for said pre-edit software and further the line number of said post-edit software in an area of said renumbering information for said post-edit software; said renumbering information creation means setting, when the line number of said post-edit software in the unrenumbered state lacks a counterpart line number in said pre-edit software, a blank to the area of said renumbering information for said pre-edit software and the renumbered line number to the area of said renumbering information for said post-edit software; said renumbering information creation means further setting, when the line number of said pre-edit software lacks a counterpart line number in said post-edit software in the unrenumbered state, the line number of said pre-edit software in the area of said renumbering information for said pre-edit software and a blank to the area of said renumbering information for said post-edit software.

9. A computer system comprising a host computer and a plurality of workstations, each of said workstations having a generation management system, said generation management system comprising:

memory means for holding generation management data set that includes: original-generation software used as a reference of software management, said original-generation software including a plurality of lines having respective line numbers; history information indicative of the history of modification of said original-generation software; and line-number history information indicative of the history of change of the line numbers in said original-generation software;

editor means for editing pre-edit software created from said generation management data set and including therein a plurality of lines carrying respective descriptions and having respective line numbers, to create post-edit software, such that said post-edit software includes therein a plurality of lines carrying respective descriptions and having respective line numbers in a state that said plurality of lines of said post-edit software are renumbered;

renumbering information creation means for creating renumbering information in which line numbers of pre-edit software and the line numbers of said post-edit software are compared with each other line by line such that a line of said post-edit software for a description corresponds to a line of said pre-edit software for an identical description;

history information creation means for creating said history information based upon comparison of said pre-edit software and said post-edit software;

wherein said history information creation means creates renumbered pre-edit software based upon said renumbering information, such that the line number of said pre-edit software for such a line carrying a description corresponding to a line of the post-edit software, is changed to be coincident to the line number of the corresponding line of the post-edit software, and such that the line number of said pre-edit software for such a line carrying a description not corresponding to a line in the post-edit software, is left unchanged, and wherein said history information creation means creates said history information by comparing each line of said renumbered pre-edit software and each line of said post-edit software.

10. A computer having a generation management system, said generation management system comprising:

memory means for holding generation management data set that includes: original-generation software used as a reference of software management, said original-generation software including a plurality of lines having respective line numbers; history information indicative of the history of modification of said original-generation software; and line-number history information indicative of the history of change of the line numbers in said original-generation software;

editor means for editing pre-edit software created from said generation management data set and including therein a plurality of lines carrying respective descriptions and having respective line numbers, to create post-edit software, such that said post-edit software includes therein a plurality of lines carrying respective descriptions and having respective line numbers in a state that said plurality of lines of said post-edit software are renumbered;

renumbering information creation means for creating renumbering information in which line numbers of pre-edit software and the line numbers of said post-edit software are compared with each other line by line such that a line of said post-edit software for a description corresponds to a line of said pre-edit software for an identical description;

history information creation means for creating said history information based upon comparison of said pre-edit software and said post-edit software;

wherein said history information creation means creates renumbered pre-edit software based upon said renumbering information, such that the line number of said pre-edit software for such a line carrying a description corresponding to a line of the post-edit software, is changed to be coincident to the line number of the corresponding line of the post-edit software, and such that the line number of said pre-edit software for such a line carrying a description not corresponding to a line in the post-edit software, is left unchanged, and wherein said history information creation means creates said history information by comparing each line of said renumbered pre-edit software and each line of said post-edit software.

11. A generation management method for managing software resources, comprising the steps of:

creating pre-edit software from a generation management data set held in a storage device of a computer system and including original-generation software, history information of said original-generation software and line-number history information of said original-generation software, such that said pre-edit software is held in a memory of said computer system;

creating post-edit software by editing and further renumbering said pre-edit software;

creating renumbering information from said pre-edit software and said post-edit software, such that said renumbering information describes a relationship between lines of pre-edit software and lines of post-edit software;

creating renumbered-pre-edit software from said pre-edit software with reference to said renumbering information, such that said renumbered-pre-edit software has line numbers renumbered in correspondence to the line numbers of said post-edit software in said renumbering information and such that the line numbers of the lines included in said pre-edit software but not included in said post-edit software are left unchanged;

creating new history information indicative of a change made to said pre-edit software, by comparing said renumbered-pre-edit software with said post-edit software line by line; and updating said history information in said storage device by said new history information.

12. A generation management method as claimed in claim 11, wherein said step of creating new history information comprises the steps of: recording an insertion of line to said history information when the line number of said post-edit software is smaller than a corresponding line number of said renumbered-pre-edit software; and recording a deletion of line to said history information when the line number of said post-edit software is larger than a corresponding line number of said renumbered-pre-edit software.

13. A generation management method as claimed in claim 12, wherein said line of said renumbered-pre-edit software is compared with a next line of said post-edit software after said step of recording an insertion of line to said history information, when the line number of said post-edit software is smaller than a corresponding line number of said renumbered-pre-edit software, and wherein said line of said post-edit software is compared with a next line of said renumbered-pre-edit software after said step of recording a deletion of line to said history information, when the line number of said post-edit software is larger than a corresponding line number of said renumbered-pre-edit software.

14. A generation management method as claimed in claim 11, wherein said step of creating said renumbering information comprises the step of comparing, line by line, said pre-edit software and said post-edit software in the state that said post-edit software is not renumbered, such that the line number of said pre-edit software is set in the area of said renumbering information for said pre-edit software and the line number of said renumbered post-edit software is set in the area of said renumbering information for said post-edit software when the line number of said pre-edit software and said post-edit software in the unrenumbered state agrees to each other, such that a blank is set to the area of said renumbering information for said pre-edit software and a renumbered line number of the line is set to the area of said renumbering information for said post-edit software when the line corresponding to the line number of said unrenumbered post-edit software does not exist in the pre-edit software, and such that the line number of said pre-edit software is set to the area of said renumbering information for said pre-edit software and a blank is set to the area of said renumbering information for said post-edit software when the line corresponding the line number of said pre-edit software does not exist in said unrenumbered post-edit software.

15. A method as claimed in claim 11, wherein said method further comprises a blank adjustment step of modifying said pre-edit software and said post-edit software such that said pre-edit software and said post-edit software include the same number of blank spaces, and wherein said step of creating new history information comprises the steps of comparing pre-edit software and post-edit software subjected to said blank adjustment step.

16. A method as claimed in claim 11, wherein said method further comprises a step of creating line-number history information indicative of a change of line numbers based upon said line-number history information in said generation management data set held in said storage device and said renumbering information.

* * * * *